United States Patent
Matsueda et al.

(10) Patent No.: US 10,427,752 B2
(45) Date of Patent: Oct. 1, 2019

(54) BICYCLE OPERATING DEVICE

(71) Applicant: SHIMANO INC., Sakai (JP)

(72) Inventors: Keiji Matsueda, Sakai (JP); Kentaro Kosaka, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 113 days.

(21) Appl. No.: 15/162,532

(22) Filed: May 23, 2016

(65) Prior Publication Data
US 2017/0334507 A1    Nov. 23, 2017

(51) Int. Cl.
*B62L 3/02* (2006.01)
*B62K 23/06* (2006.01)
*B62M 25/04* (2006.01)

(52) U.S. Cl.
CPC .............. *B62L 3/023* (2013.01); *B62K 23/06* (2013.01); *B62M 25/04* (2013.01)

(58) Field of Classification Search
CPC ....................................................... B62L 3/023
See application file for complete search history.

(56) References Cited

U.S. PATENT DOCUMENTS

| | | | | |
|---|---|---|---|---|
| 3,802,200 A | * | 4/1974 | Kolm | B62L 3/023 60/588 |
| 4,598,954 A | * | 7/1986 | Hayashi | B60T 8/261 188/106 P |
| 5,443,134 A | * | 8/1995 | Gajek | B62L 1/14 188/2 D |
| 5,950,772 A | * | 9/1999 | Buckley | B62K 23/06 188/18 A |
| 6,341,673 B1 | * | 1/2002 | Kuo | B62L 3/00 188/24.22 |
| 2012/0160625 A1 | | 6/2012 | Jordan | |
| 2013/0333994 A1 | * | 12/2013 | Jordan | B62L 3/02 188/344 |
| 2014/0144275 A1 | | 5/2014 | Kariyama et al. | |
| 2014/0174244 A1 | * | 6/2014 | Watarai | B62M 25/00 74/502.2 |
| 2015/0203169 A1 | | 7/2015 | Nishino | |

FOREIGN PATENT DOCUMENTS

| | | |
|---|---|---|
| CN | 103847923 | 6/2014 |
| DE | 10 2013 227 027 | 6/2015 |
| DE | 10 2015 100 784 | 7/2015 |
| EP | 0110529 | 6/1984 |
| TW | 201402395 | 1/2014 |

\* cited by examiner

*Primary Examiner* — F Daniel Lopez
(74) *Attorney, Agent, or Firm* — Mori & Ward, LLP

(57) ABSTRACT

A bicycle operating device comprises a base member, a hydraulic cylinder, a piston, and a fluid passageway. The base member is configured to be mounted to a bicycle. The hydraulic cylinder is provided on the base member and includes a cylinder bore. The piston is movably provided in the cylinder bore. The cylinder bore and the piston define a hydraulic chamber. The fluid passageway is connected to the hydraulic chamber. The fluid passageway is provided inside the base member. The fluid passageway has a length longer than a stroke of the piston.

25 Claims, 22 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, a hydraulic cylinder, a piston, and a fluid passageway. The base member is configured to be mounted to a bicycle. The hydraulic cylinder is provided on the base member and includes a cylinder bore. The piston is movably provided in the cylinder bore. The cylinder bore and the piston define a hydraulic chamber. The fluid passageway is connected to the hydraulic chamber. The fluid passageway is provided inside the base member. The fluid passageway has a length longer than a stroke of the piston.

With the bicycle operating device according to the first aspect, it is possible to utilize the base member as an area in which the fluid passageway is provided with maintaining a desired length of the fluid passageway. Accordingly, it is possible to make the bicycle operating device compact with maintaining a desired length of the fluid passageway. Further, it is possible to connect a hydraulic hose to the fluid passageway at a preferable location of the base member.

In accordance with another aspect of the present invention, a bicycle operating device comprises a base member, a hydraulic cylinder, a piston, and a fluid passageway. The base member is configured to be mounted to a bicycle. The hydraulic cylinder is provided on the base member and includes a cylinder bore. The piston is movably provided in the cylinder bore. The cylinder bore and the piston define a hydraulic chamber. The fluid passageway is connected to the hydraulic chamber. The fluid passageway is provided inside the base member. The fluid passageway includes a first part and a second part farther from the cylinder bore than the first part in the fluid passageway. The first part extends so as to taper toward the second part. The second part extends so as to taper toward the first part.

With the bicycle operating device according to this aspect, it is possible to utilize the base member as an area in which the fluid passageway is provided. Furthermore, it is possible to easily remove, after forming of the base member, a first core and a second core which are arranged to form the first part and the second part during the forming of the base member. Accordingly, it is possible to easily form the fluid passageway with making the bicycle operating device compact.

In accordance with further aspect of the present invention, a bicycle operating device comprises a base member, a hydraulic cylinder, a piston, and a fluid passageway. The base member is configured to be mounted to a bicycle and includes an outer peripheral surface. The hydraulic cylinder is provided on the base member and includes a cylinder bore. The piston is movably provided in the cylinder bore. The cylinder bore and the piston define a hydraulic chamber. The fluid passageway is connected to the hydraulic chamber. The fluid passageway is provided inside the base member so as to at least partly extend between the outer peripheral surface and the cylinder bore.

With the bicycle operating device according to this aspect, it is possible to utilize the base member as an area in which the fluid passageway is provided with maintaining a desired length of the fluid passageway. Accordingly, it is possible to make the bicycle operating device compact with maintaining a desired length of the fluid passageway. Further, it is possible to connect a hydraulic hose to the fluid passageway at a preferable location of the base member.

In accordance with a second aspect of the present invention, the bicycle operating device according to any one of the above aspects is configured so that the base member includes an inner peripheral surface provided in the base member and defining the fluid passageway.

With the bicycle operating device according to the second aspect, it is possible to effectively utilize the base member as the area in which the fluid passageway.

In accordance with a third aspect of the present invention, the bicycle operating device according to any one of the above aspects is configured so that the base member includes a base body and a pipe part at least partly disposed in the base body and integrally provided with the base body. The pipe part includes the inner peripheral surface.

With the bicycle operating device according to the third aspect, it is possible to easily form the fluid passageway.

In accordance with a fourth aspect of the present invention, the bicycle operating device according to any one of the above aspects is configured so that the fluid passageway includes a first part and a second part farther from the cylinder bore than the first part in the fluid passageway.

With the bicycle operating device according to the fourth aspect, it is possible to effectively utilize a part of the base member which is farther from the cylinder bore as the area in which the fluid passageway is provided.

In accordance with a fifth aspect of the present invention, the bicycle operating device according to any one of the above aspects is configured so that the first part extends so as to taper toward the second part. The second part extends so as to taper toward the first part.

With the bicycle operating device according to the fifth aspect, it is possible to easily remove, after forming of the base member, a first core and a second core which are arranged to form the first part and the second part during the forming of the base member.

In accordance with a sixth aspect of the present invention, the bicycle operating device according to any one of the above aspects is configured so that the first part extends in a first direction. The second part extends in a second direction different from the first direction.

With the bicycle operating device according to the sixth aspect, it is possible to arrange the fluid passageway along the shape of the base member, improving design freedom of the fluid passageway.

In accordance with a seventh aspect of the present invention, the bicycle operating device according to any one of the above aspects is configured so that at least one of the first part and the second part linearly extends.

With the bicycle operating device according to the seventh aspect, it is possible to easily form the at least one of the first part and the second part.

In accordance with an eighth aspect of the present invention, the bicycle operating device according to any one of the above aspects is configured so that the fluid passageway further includes a third part connecting the first part to the second part.

With the bicycle operating device according to the eighth aspect, it is possible to connect the first part to the second part to bring the first part into communication with the second part even if the first part is spaced apart from the second part.

In accordance with a ninth aspect of the present invention, the bicycle operating device according to any one of the above aspects is configured so that the first part has a first inner diameter. The second part has a second inner diameter. The third part has a third inner diameter different from each of the first inner diameter and the second inner diameter.

With the bicycle operating device according to the ninth aspect, it is possible to easily form a connecting part connecting the first part to the second part by using the third part.

In accordance with a tenth aspect of the present invention, the bicycle operating device according to any one of the above aspects is configured so that the third inner diameter is larger than each of the first inner diameter and the second inner diameter.

With the bicycle operating device according to the tenth aspect, it is possible to more easily form a connecting part connecting the first part to the second part by using the third part.

In accordance with an eleventh aspect of the present invention, the bicycle operating device according to any one of the above aspects is configured so that the base member includes a first side surface and a second side surface laterally opposite to the first side surface in a mounting state where the bicycle operating device is mounted to the bicycle. The cylinder bore is provided between the first side surface and the second side surface. The first part is provided between the first side surface and the cylinder bore. The second part and the third part are closer to the first side surface than the second side surface.

With the bicycle operating device according to the eleventh aspect, it is possible to effectively utilize the base member as an area in which the first to third parts are provided.

In accordance with a twelfth aspect of the present invention, the bicycle operating device according to any one of the above aspects is configured so that the base member includes a first side surface and a second side surface laterally opposite to the first side surface in a mounting state where the bicycle operating device is mounted to the bicycle. The cylinder bore is provided between the first side surface and the second side surface. The first part is provided between the second side surface and the cylinder bore. The third part is closer to the second side surface than the first side surface. The second part extends from the third part toward the first side surface.

With the bicycle operating device according to the twelfth aspect, it is possible to effectively utilize the base member as an area in which the first to third parts are provided.

In accordance with a thirteenth aspect of the present invention, the bicycle operating device according to any one of the above aspects is configured so that the fluid passageway further includes a fourth part connecting the cylinder bore to the first part.

With the bicycle operating device according to the thirteenth aspect, it is possible to connect the cylinder bore to the first part via the fourth part.

In accordance with a fourteenth aspect of the present invention, the bicycle operating device according to any one of the above aspects is configured so that the fourth part perpendicularly extends from the cylinder bore.

With the bicycle operating device according to the fourteenth aspect, it is possible to effectively utilize an area which is radially outward of the cylinder bore in the base member.

In accordance with a fifteenth aspect of the present invention, the bicycle operating device according to any one of the above aspects is configured so that the first part perpendicularly extends from the fourth part.

With the bicycle operating device according to the fifteenth aspect, it is possible to improve design freedom of the arrangement of the fluid passageway.

In accordance with a sixteenth aspect of the present invention, the bicycle operating device according to any one of the above aspects is configured so that the base member includes a first end portion, a second end portion, a grip portion, and an outlet port. The second end portion is opposite to the first end portion and is configured to be mounted to a handlebar of the bicycle. The grip portion is provided between the first end portion and the second end portion. The outlet port is connected to the fluid passageway and provided at the second end portion.

With the bicycle operating device according to the sixteenth aspect, it is possible to introduce a hydraulic pressure to a hydraulic bicycle component via the outlet port of the base member.

In accordance with a seventeenth aspect of the present invention, the bicycle operating device according to any one of the above aspects is configured so that the base member is made of a resin material.

With the bicycle operating device according to the seventeenth aspect, it is possible to easily form the base member with saving weight of the base member.

In accordance with an eighteenth aspect of the present invention, the bicycle operating device according to any one of the above aspects further comprises a cover member attached to the base member to at least partly cover the base member. The cover member is at least partly made of elastic material.

With the bicycle operating device according to the eighteenth aspect, it is possible to improve comfort to operate the bicycle operating device for a rider and/or to easily grip the bicycle operating device for the rider.

In accordance with a nineteenth aspect of the present invention, the bicycle operating device according to any one of the above aspects further comprises a shifting unit to operate a shifting device.

With the bicycle operating device according to the nineteenth aspect, it is possible to operate the shifting device in addition to a hydraulic bicycle component.

In accordance with a twentieth aspect of the present invention, the bicycle operating device according to any one of the above aspects is configured so that the piston is movable relative to the hydraulic cylinder in a movement direction. The hydraulic chamber has a chamber axial length defined in the movement direction. The length of the fluid passageway is longer than the chamber axial length.

With the bicycle operating device according to the twentieth aspect, it is possible to effectively utilize the base member as the area in which the fluid passageway is provided with maintaining the desired length of the fluid passageway.

In accordance with a twenty-first aspect of the present invention, the bicycle operating device according to any one of the above aspects is configured so that the cylinder bore has a cylinder axial length defined in the movement direction. The length of the fluid passageway is longer than the cylinder axial length.

With the bicycle operating device according to the twenty-first aspect, it is possible to more effectively utilize the base member as the area in which the fluid passageway is provided with maintaining the desired length of the fluid passageway.

In accordance with a twenty-second aspect of the present invention, the bicycle operating device according to any one of the above aspects further comprises an operating member configured to be pivotable relative to the base member about a pivot axis between a rest position and an operated position. The piston is configured to be pushed from an initial position to an actuated position in response to a movement of the operating member from the rest position toward the operated position to supply a hydraulic pressure toward at least one bicycle component.

With the bicycle operating device according to the twenty-second aspect, it is possible to operate the at least one bicycle component by using the operating member and the hydraulic pressure.

In accordance with a twenty-third aspect of the present invention, a bicycle operating device comprises a hydraulic unit and a base member. The hydraulic unit comprises a hydraulic cylinder and a piston. The hydraulic cylinder includes a cylinder bore. The piston is movably provided in the cylinder bore. The cylinder bore and the piston define a hydraulic chamber. The base member is configured to be mounted to a bicycle and includes a fluid passageway connected to the hydraulic chamber. The fluid passageway is provided inside the base member. The fluid passageway includes a first part and a second part farther from the cylinder bore than the first part in the fluid passageway. The first part extending so as to taper toward the second part. The second part extending so as to taper toward the first part.

With the bicycle operating device according to the twenty-third aspect, it is possible to utilize the base member as an area in which the fluid passageway is provided. Furthermore, it is possible to easily remove, after forming of the base member, a first core and a second core which are arranged to form the first part and the second part during the forming of the base member. Accordingly, it is possible to easily form the fluid passageway with making the bicycle operating device compact.

In accordance with a twenty-fourth aspect of the present invention, a bicycle operating device comprises a base member, a hydraulic cylinder, a piston, and a fluid passageway. The base member is configured to be mounted to a bicycle and includes an outer peripheral surface. The hydraulic cylinder is provided on the base member and includes a cylinder bore. The piston is movably provided in the cylinder bore. The cylinder bore and the piston define a hydraulic chamber. The fluid passageway is connected to the hydraulic chamber. The fluid passageway is provided inside the base member so as to at least partly extend between the outer peripheral surface and the cylinder bore.

With the bicycle operating device according to the twenty-fourth aspect, it is possible to utilize the base member as an area in which the fluid passageway is provided with maintaining a desired length of the fluid passageway. Accordingly, it is possible to make the bicycle operating device compact with maintaining a desired length of the fluid passageway. Further, it is possible to connect a hydraulic hose to the fluid passageway at a preferable location of the base member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
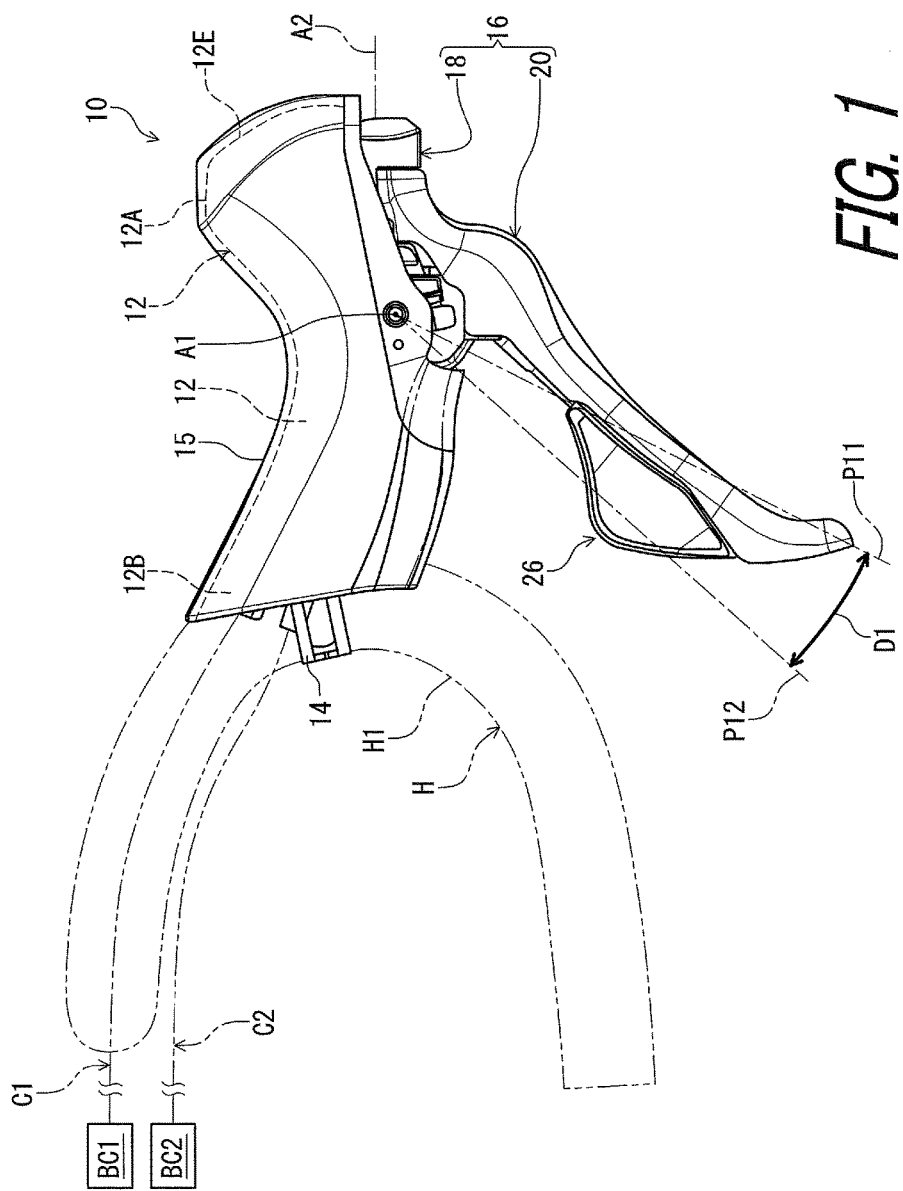
FIG. 1 is a right side elevational view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar H of a bicycle. In this embodiment, the bicycle operating device 10 is configured to be mounted to a drop-down handlebar. However, structures of the bicycle operating device 10 can be applied to other type of handlebars such as a flat handlebar, a time trial handlebar, and a bull horn handlebar. The handlebar H can also be referred to as the drop-down handlebar H. Furthermore, the bicycle operating device 10 can be mounted to parts other than the handlebar H in the bicycle. Since structures of the bicycle have been known in the bicycle field, they will not be described in detail here for the sake of brevity.

The bicycle operating device 10 is operatively coupled to a hydraulic bicycle component BC1 such as a hydraulic bicycle brake. In this embodiment, the bicycle operating device 10 is operatively coupled to the hydraulic bicycle component BC1 via a hydraulic hose C1.

Furthermore, the bicycle operating device 10 is operatively coupled to an additional bicycle component BC2. In this embodiment, the bicycle operating device 10 is operatively coupled to the additional bicycle component BC2 via a mechanical control cable C2. Examples of the additional bicycle component BC2 include a shifting device, an adjustable seatpost assembly, and a bicycle suspension. Examples of the mechanical control cable C2 include a Bowden cable. In this embodiment, the additional bicycle component BC2 includes the shifting device to change a speed stage of a bicycle. The additional bicycle component BC2 can also be referred to as the shifting device BC2.

In this embodiment, the bicycle operating device 10 is a right hand side control device configured to be operated by the rider's right hand to actuate the hydraulic bicycle component BC1 and the additional bicycle component BC2. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of the bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

As seen in FIG. 1, the bicycle operating device 10 comprises a base member 12. The base member 12 is configured to be mounted to the handlebar H of the bicycle. However, the base member 12 can be mounted to parts other than the handlebar H in the bicycle. The base member 12 includes a first end portion 12A, a second end portion 12B, and a grip portion 12C. The second end portion 12B is opposite to the first end portion 12A and is configured to be mounted to the handlebar H. The grip portion 12C is provided between the first end portion 12A and the second end portion 12B.

The drop-down handlebar H includes a curved part H1. The second end portion 12B is configured to be coupled to the curved part H1 in a mounting state where the bicycle operating device 10 is mounted to the handlebar H. The bicycle operating device 10 comprises a mounting clamp 14 to couple the base member 12 to the handlebar H.

Figure 2:
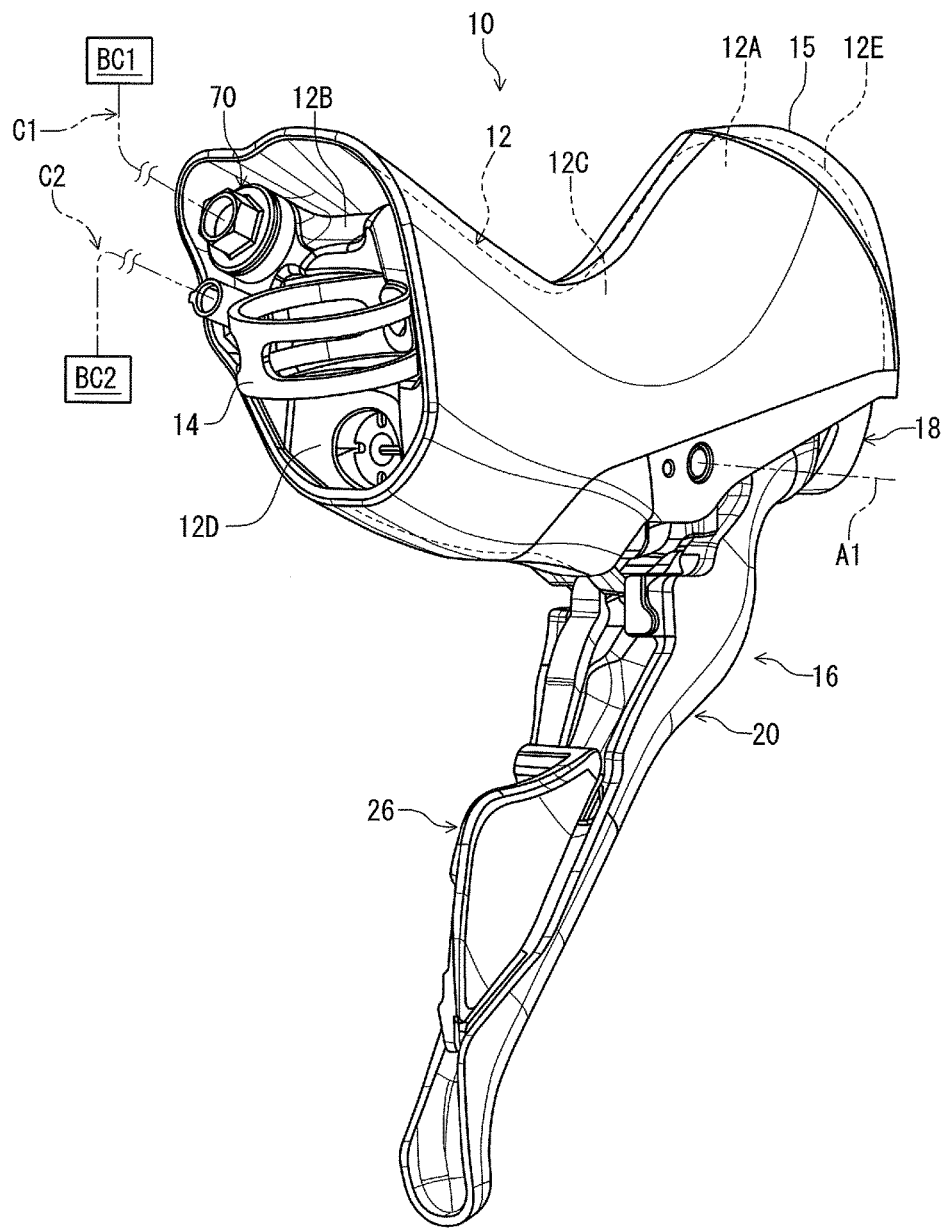
FIG. 2 is a perspective view of the bicycle operating device illustrated in FIG. 1.

As seen in FIG. 2, the second end portion 12B includes a mounting surface 12D having a curved shape corresponding to the drop-down handlebar H. Specifically, the mounting surface 12D has the curved shape corresponding to an outer peripheral surface of the curved part H1.

As seen in FIGS. 1 and 2, the first end portion 12A includes a pommel portion 12E. The pommel portion 12E extends obliquely upward from the grip portion 12C. The pommel portion 12E is disposed above the second end portion 12B in the mounting state of the bicycle operating device 10. The pommel portion 12E can also be configured to be graspable if needed and/or desired.

In this embodiment, the bicycle operating device 10 further comprises a cover member 15 attached to the base member 12 to at least partly cover the base member 12. The cover member 15 is at least partly made of elastic material such as rubber.

As seen in FIG. 1, the bicycle operating device 10 comprises an operating member 16 pivotally coupled to the base member 12 about a pivot axis A1. The operating member 16 extends downward from the base member 12 in the mounting state of the bicycle operating device 10. In this embodiment, the operating member 16 is pivotable relative to the base member 12 about the pivot axis A1 in a first operating direction D1. The operating member 16 is configured to be pivotable relative to the base member 12 between a rest position P11 (hereinafter the first rest position P11) and an operated position P12 (hereinafter the second rest position P12). The first operating direction D1 is a circumferential direction defined about the pivot axis A1. In this embodiment, the operating member 16 is provided as a brake operating lever pivotable about the pivot axis A1.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform the operation of the bicycle component.

Figure 3:
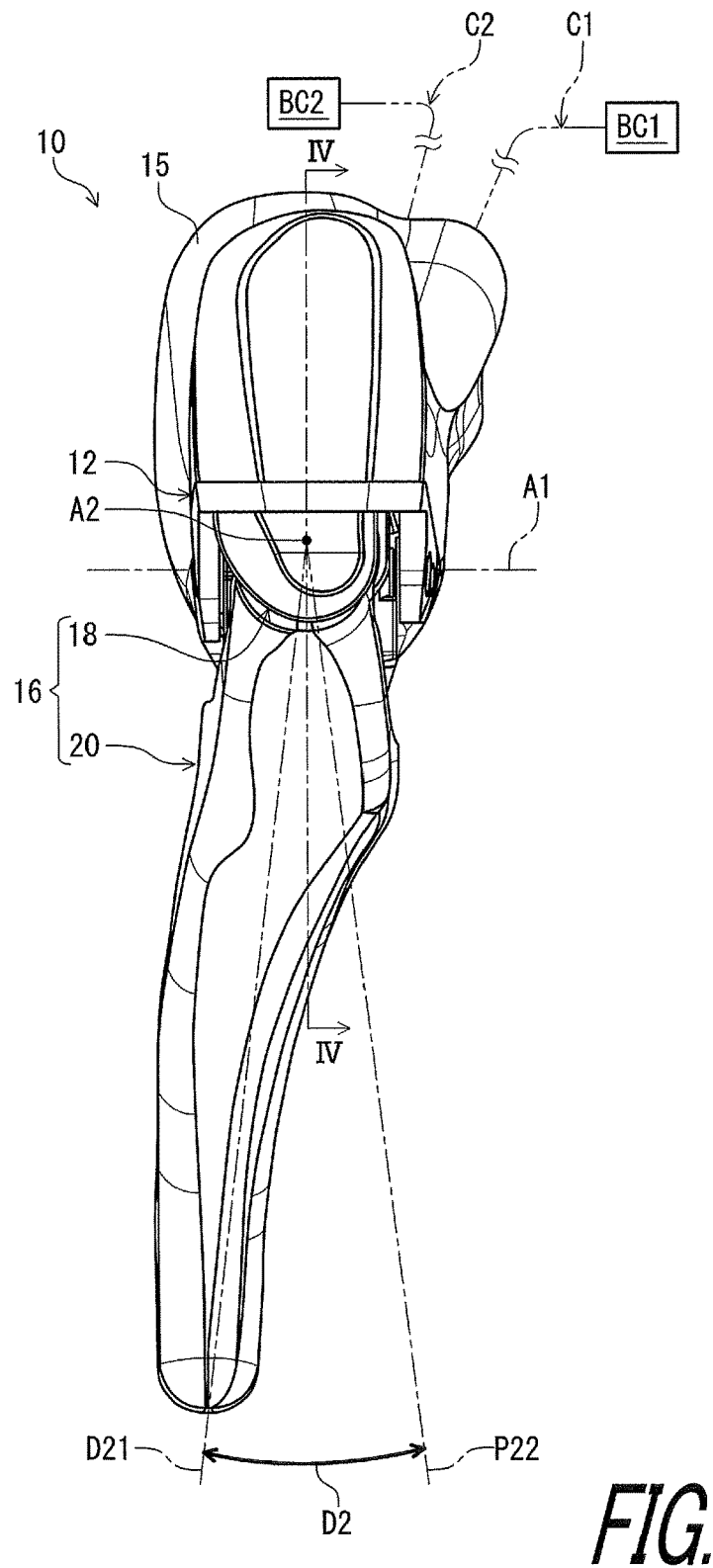
FIG. 3 is a front view of the bicycle operating device illustrated in FIG. 1.

As seen in FIG. 3, the operating member 16 is pivotable relative to the base member 12 about the additional pivot axis A2 in a second operating direction D2. The operating member 16 is pivotable relative to the base member 12 about the additional pivot axis A2 in the second operating direction D2. The operating member 16 is pivotable relative to the base member 12 between a second rest position P21 and a second operated position P22. The second operating direction D2 is a circumferential direction defined about the additional pivot axis A2. In this embodiment, the operating member 16 is provided as a shift lever pivotable about the additional pivot axis A2. However, the function of the shift lever can be omitted from the operating member 16.

As seen in FIGS. 1 and 3, the operating member 16 includes a base portion 18 and an operating portion 20. The base portion 18 is pivotally coupled to the base member 12 about the pivot axis A1. The operating portion 20 is pivotally provided on the base portion 18 about the additional pivot axis A2.

Figure 4:
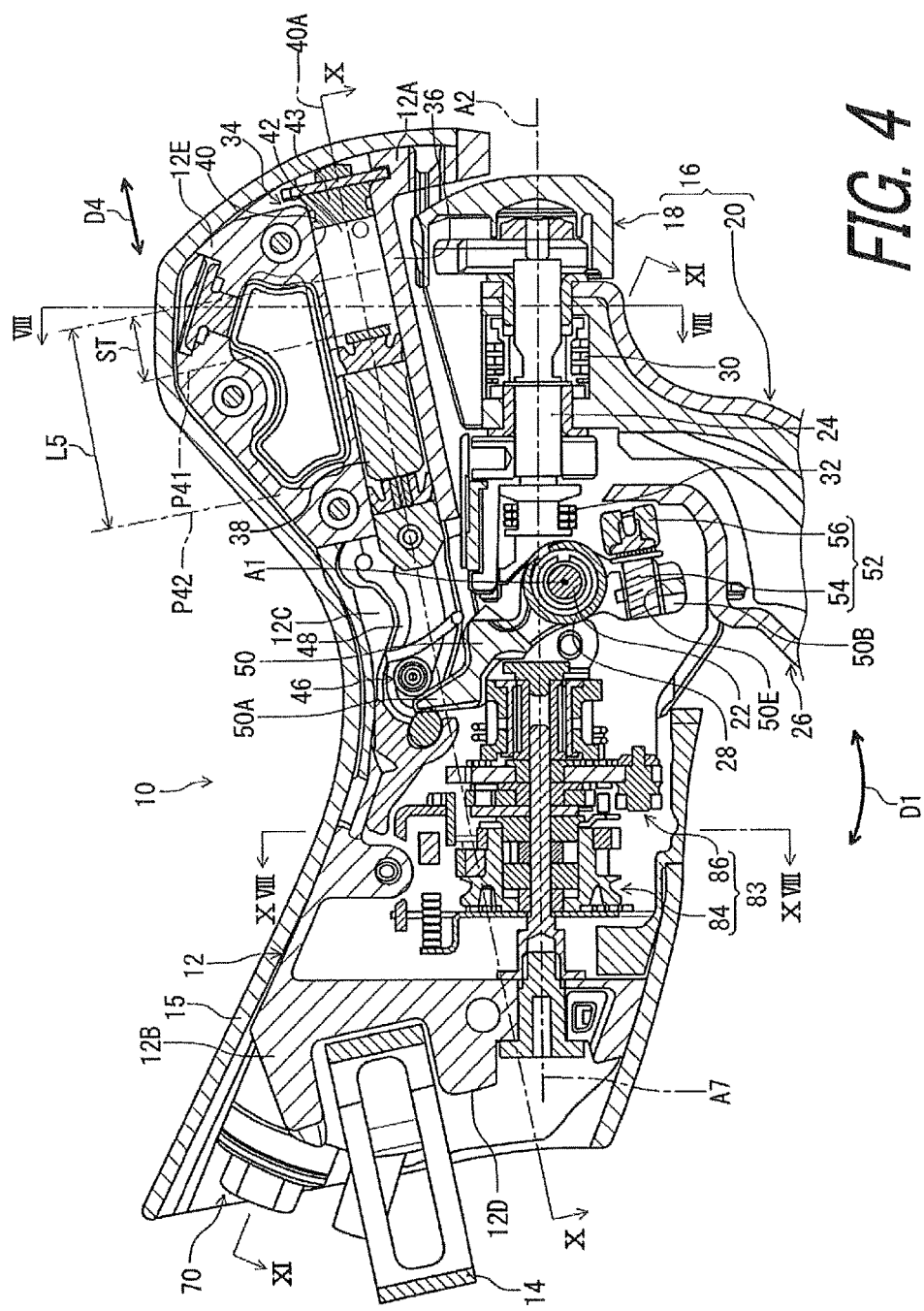
FIG. 4 is a partial cross-sectional view of the bicycle operating device taken along line IV-IV of FIG. 3.

As seen in FIG. 4, the bicycle operating device 10 comprises a pivot pin 22 and an additional pivot pin 24. The pivot pin 22 defines the pivot axis A1. The additional pivot pin 24 defines the additional pivot axis A2. The base portion 18 is pivotally coupled to the base member 12 via the pivot pin 22. The operating portion 20 is pivotally coupled to the base portion 18 about via the additional pivot pin 24.

Figure 5:
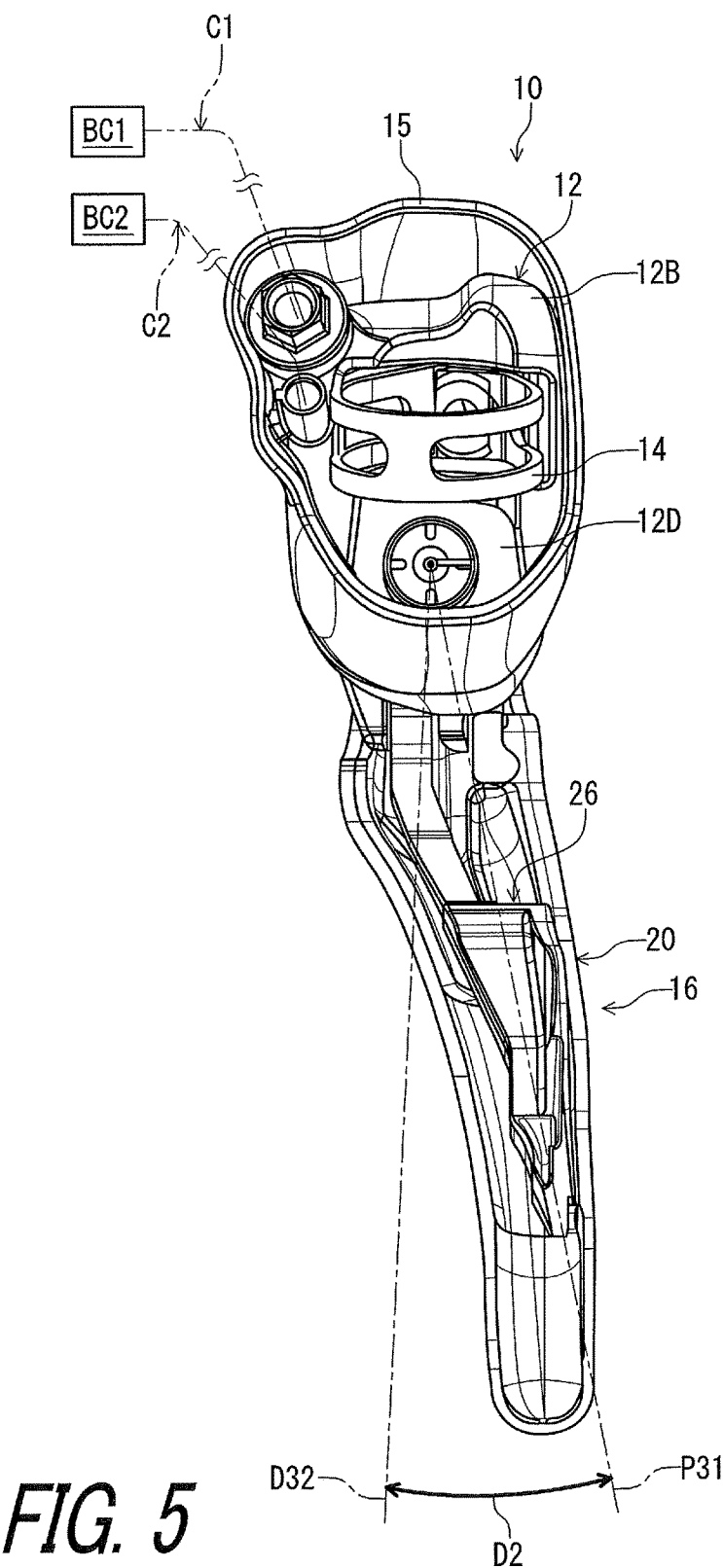
FIG. 5 is a rear view of the bicycle operating device illustrated in FIG. 1.

As seen in FIGS. 1 and 5, the bicycle operating device 10 further comprises an additional operating member 26. The additional operating member 26 is pivotally provided on one of the operating member 16 and the base member 12 about the additional pivot axis A2. In this embodiment, the additional operating member 26 is provided on the operating member 16. Specifically, the additional operating member 26 is pivotable relative to the base member 12 about the additional pivot axis A2 in the second operating direction D2. The additional operating member 26 is pivotable relative to the base member 12 between a third rest position P31 and a third operated position P32. The additional operating member 26 is pivotally coupled to the base portion 18 via the additional pivot pin 24. The additional operating member 26 is pivotable relative to the base portion 18 about the additional pivot axis A2. In this embodiment, the additional operating member 26 is provided as an additional shift lever pivotable about the additional pivot axis A2. The additional operating member 26 can be omitted from the bicycle operating device 10.

As seen in FIG. 4, the bicycle operating device 10 comprises a first biasing member 28 to bias the operating member 16 toward the first rest position P11 (FIG. 1) relative to the base member 12. The first biasing member 28 is mounted on the pivot pin 22. The base portion 18 is in contact with the base member 12 in a rest state where the operating member 16 is at the first rest position P11. For example, the first biasing member 28 includes a torsion spring.

The bicycle operating device 10 comprises a second biasing member 30 to bias the operating member 16 toward the second rest position P21 (FIG. 3) relative to the base member 12. In this embodiment, the second biasing member 30 biases the operating portion 20 toward the second rest position P21 (FIG. 3) relative to the base portion 18. The second biasing member 30 is mounted on the additional pivot pin 24. The operating portion 20 is in contact with the base portion 18 in a state where the operating portion 20 is at the second rest position. For example, the second biasing member 30 includes a torsion spring.

The bicycle operating device 10 comprises a third biasing member 32 to bias the additional operating member 26 toward the third rest position P31 (FIG. 5) relative to the base member 12. In this embodiment, the third biasing member 32 biases the additional operating member 26 toward the third rest position P31 (FIG. 5) relative to the operating member 16 (the base portion 18). The third biasing member 32 is mounted on the additional pivot pin 24. As seen in FIG. 5, the additional operating member 26 is in contact with the operating member 16 (the operating portion 20) in a state where the operating member 16 and the additional operating member 26 are at the second rest position P21 and the third rest position P31. For example, the third biasing member 32 includes a torsion spring.

As seen in FIG. 4, the bicycle operating device 10 comprises a hydraulic unit 34 provided on the base member 12. The hydraulic unit 34 comprises a hydraulic cylinder 36 and a piston 38. Namely, the bicycle operating device 10 comprises the base member 12, the hydraulic cylinder 36, and the piston 38. The hydraulic cylinder 36 is provided on the base member 12 and includes a cylinder bore 40. The piston 38 is movably provided in the cylinder bore 40. The cylinder bore 40 and the piston 38 define a hydraulic chamber 42. In this embodiment, the hydraulic unit 34 includes a closing member 43 attached to the hydraulic cylinder 36 to close an end of the cylinder bore 40. The cylinder bore 40, the piston 38, and the closing member 43 define the hydraulic chamber 42.

The piston 38 is movable relative to the hydraulic cylinder 36 in a movement direction D4, in response to the movement of the operating member 16 in the first operating direction D1. Specifically, the piston 38 is movable relative to the hydraulic cylinder 36 between an initial position P41 and an actuated position P42. The initial position P41 corresponds to the first rest position P11 (FIG. 1) of the operating member 16. The actuated position P42 corresponds to the first operated position P12 (FIG. 2) of the operating member 16. Specifically, the piston 38 is at the initial position P41 in the rest state where the operating member 16 is at the first rest position P11 (FIG. 1). The piston 38 is at the actuated position P42 in an operated state where the operating member 16 is at the first operated position P12 (FIG. 1). The piston 38 is configured to be pushed from the initial position P41 to the actuated position P42 in response to the movement of the operating member 16 from the first rest position P11 toward the operated position P12 to supply a hydraulic pressure toward at least one bicycle component BC1.

As seen in FIG. 4, the piston 38 is movable relative the hydraulic cylinder 36 by a stroke ST defined from the initial position P41 to the actuated position P42. The stroke ST of the piston 38 is defined in the movement direction D4. The hydraulic chamber 42 has a variable internal volume which is variable in response to the movement of the piston 38. In this embodiment, the stroke ST of the piston 38 is adjustable between a maximum stroke and a minimum stroke as described later. In such the embodiment, the stroke ST of the piston 38 can be defined as the minimum stroke.

Figure 6:
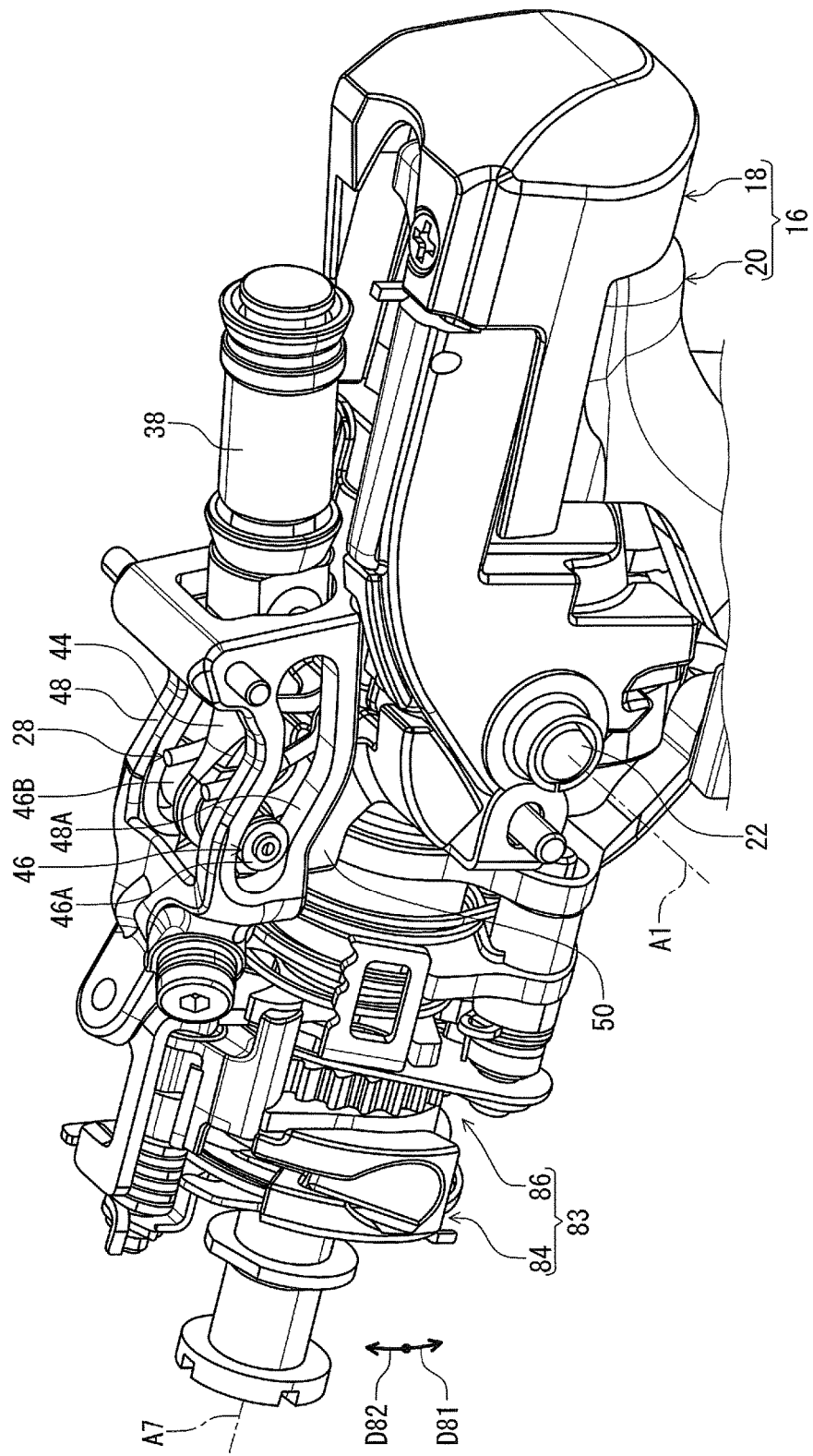
FIG. 6 is a perspective view of an internal structure of the bicycle operating device illustrated in FIG. 1.
Figure 7:
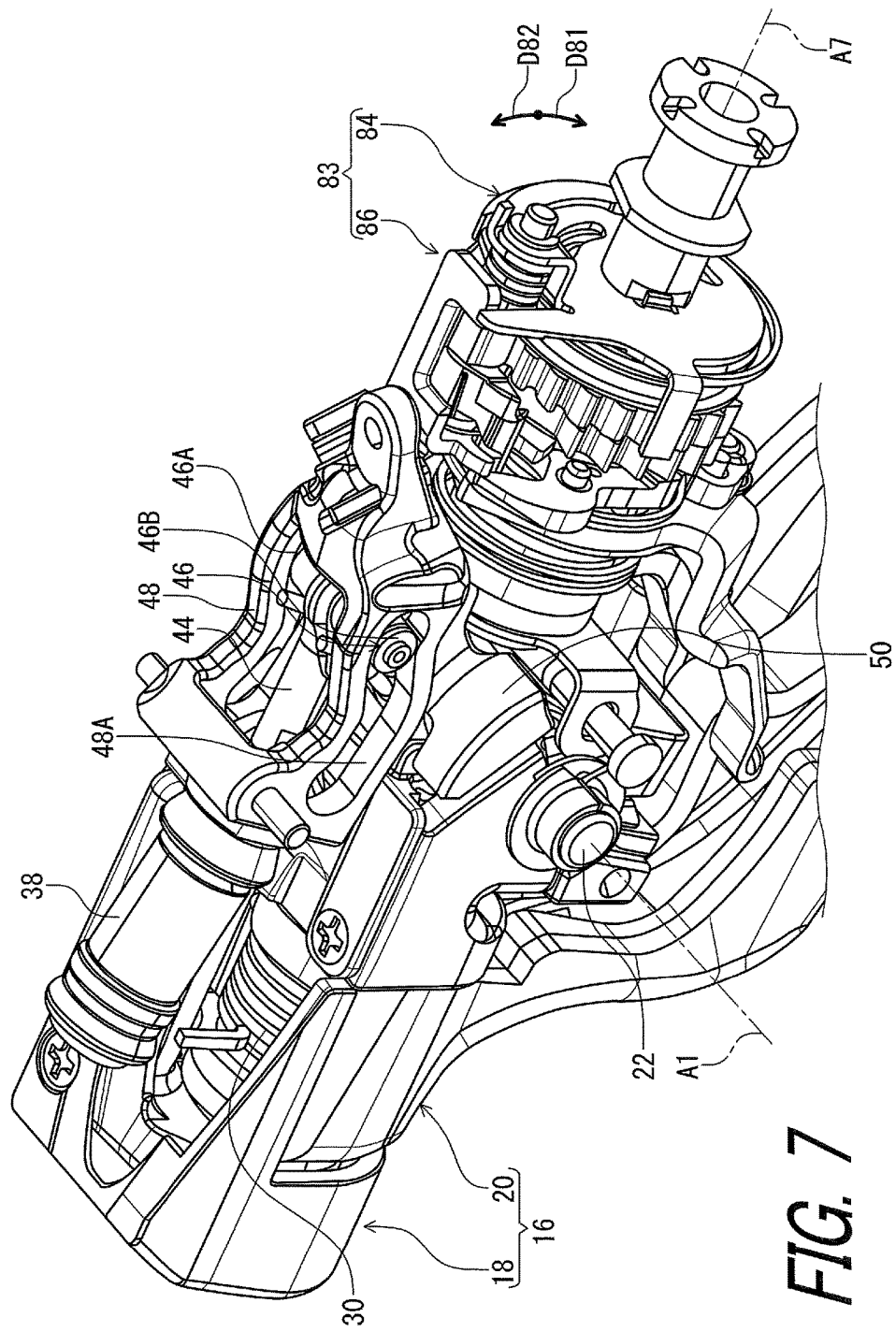
FIG. 7 is another perspective view of the internal structure of the bicycle operating device illustrated in FIG. 1.

As seen in FIGS. 4, 6, and 7, the bicycle operating device 10 comprises a piston rod 44, a guide pin 46, a guide member 48, and a transmitting member 50. The piston rod 44 is operatively coupled to the piston 38. The guide pin 46 is attached to the piston rod 44. The guide member 48 is made of a metric material such as a titanium alloy, a stainless steel and an aluminum alloy. The guide member 48 is detachably attached to the base member 12. The guide member 48 includes a pair of guide grooves 48A and 48B. Both ends 46A and 46B of the guide pin 46 are movably provided in the guide grooves 48A and 48B. The first biasing member 28 biases the guide pin 46. The piston 38, the piston rod 44, the guide pin 46 and the guide member 48 is detachable as a unit from the base member 12. The transmitting member 50 is pivotable relative to the base member 12 about the pivot axis A1 to transmit the movement of the operating member 16 to the guide pin 46.

As seen in FIG. 4, the transmitting member 50 includes a first transmitting end 50A and a second transmitting end 50B. The first transmitting end 50A is in contact with the guide pin 46. The second transmitting end 50B is disposed opposite the first transmitting end 50A relative to the pivot axis A1.

As seen in FIG. 4, the bicycle operating device 10 comprises an adjustment member 52. The adjustment member 52 is rotatably attached to the second transmitting end 50B. The adjustment member 52 includes an adjustment screw 54 and an adjustment contact part 56. The transmitting member 50 includes a threaded hole 50C disposed at the second transmitting end 50B. The adjustment screw 54 is threadedly engaged with the threaded hole 50C. The adjustment contact part 56 is rotatably coupled to an end of the adjustment screw 54. The adjustment contact part 56 is coupled to the base portion 18 to be restricted from rotating relative to the base portion 18. An adjustment biasing element (not shown) is provided between the transmitting member 50 and the base portion 18 to bias the transmitting member 50 and the base portion 18 to push the base portion 18 against the adjustment contact part 56. Rotation of the adjustment screw 54 relative to the transmitting member 50 changes a distance between the second transmitting end 50B and the base portion 18, changing the first rest position P11 of the operating member 16 relative to the base member 12.

Figure 8:
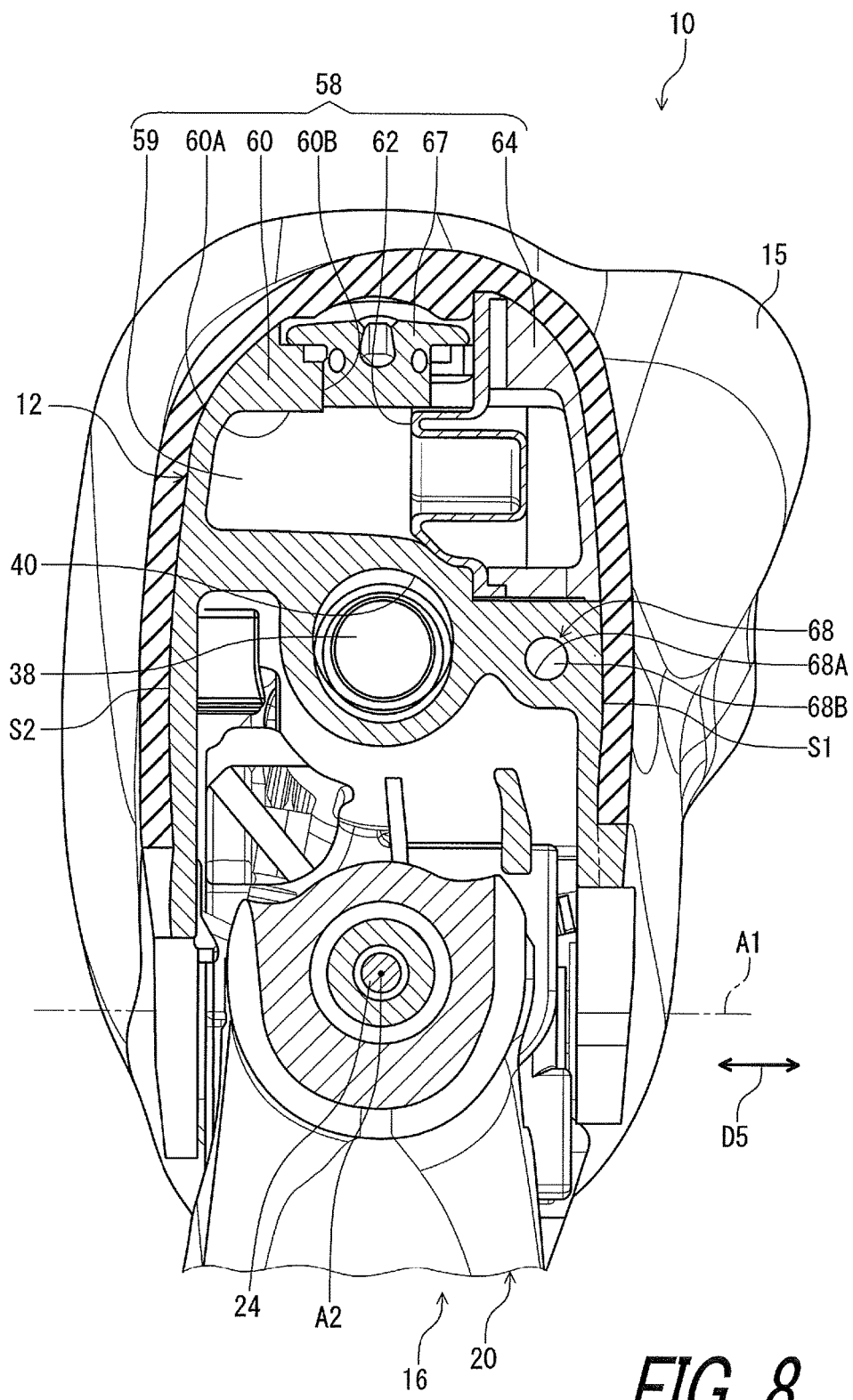
FIG. 8 is a cross-sectional view of the bicycle operating device taken along line VIII-VIII of FIG. 4.
Figure 9:
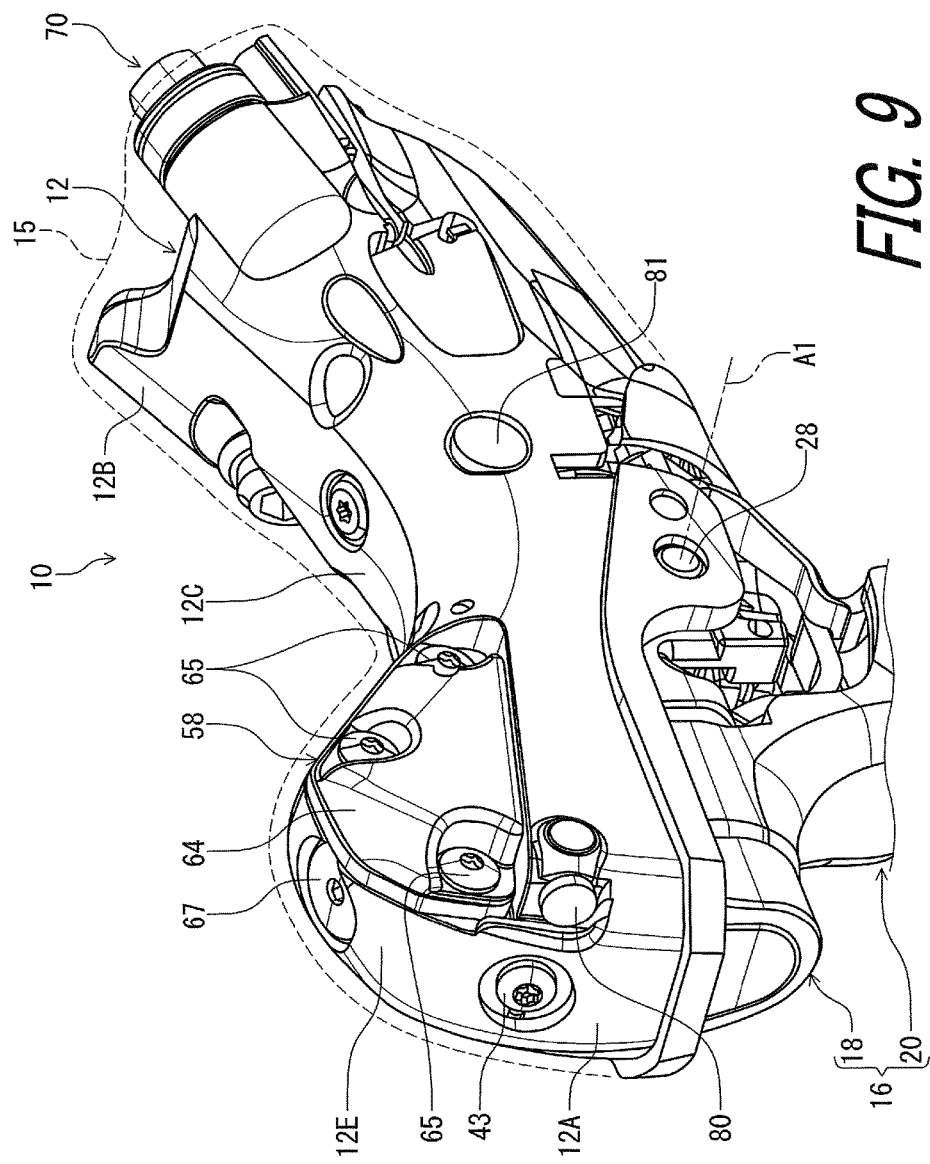
FIG. 9 is a perspective view of the bicycle operating device illustrated in FIG. 1 with a cover member omitted.

As seen in FIG. 8, the hydraulic unit 34 comprises a hydraulic reservoir 58. The hydraulic reservoir 58 includes a reservoir chamber 59 connected to the hydraulic chamber 42. As seen in FIG. 4, the hydraulic reservoir 58 is provided at the first end portion 12A. In this embodiment, as seen in FIGS. 8 and 9, the hydraulic reservoir 58 is provided at the pommel portion 12E.

As seen in FIG. 8, the hydraulic reservoir 58 includes a reservoir tank 60, a diaphragm 62, and a lid 64. The reservoir tank 60 includes a recess 60A. In this embodiment, the reservoir tank 60 is integrally provided with the hydraulic cylinder 36 as a one-piece unitary member. However, the reservoir tank 60 can be a separate member from the hydraulic cylinder 36. The diaphragm 62 is at least partly disposed in the recess 60A. The reservoir tank 60 and the diaphragm 62 define the reservoir chamber 59 in the recess 60A. In this embodiment, the hydraulic reservoir 58 includes a bleed member 67. The bleed member 67 is detachably attached to the reservoir tank 60 to close a hole 60B of the reservoir tank 60. The reservoir tank 60, the diaphragm 62, and the bleed member 67 define the reservoir chamber 59 in the recess 60A. The reservoir chamber 59 is connected to the hydraulic chamber 42 via at least one connection holes (not shown). As seen in FIGS. 8 and 9, the lid 64 is detachably attached to the base member 12 with fasteners 65 to cover the recess 60A. The hydraulic reservoir 58 can be omitted from the bicycle operating device 10.

As seen in FIGS. 4 and 8, the cylinder bore 40 is at least partly provided above the pivot axis A1 in the mounting state where the bicycle operating device 10 is mounted to the handlebar H (FIG. 1). The reservoir chamber 59 is provided above the cylinder bore 40 without overlapping with the cylinder bore 40 in a transverse direction D5 parallel to the pivot axis A1 in the mounting state.

Figure 10:
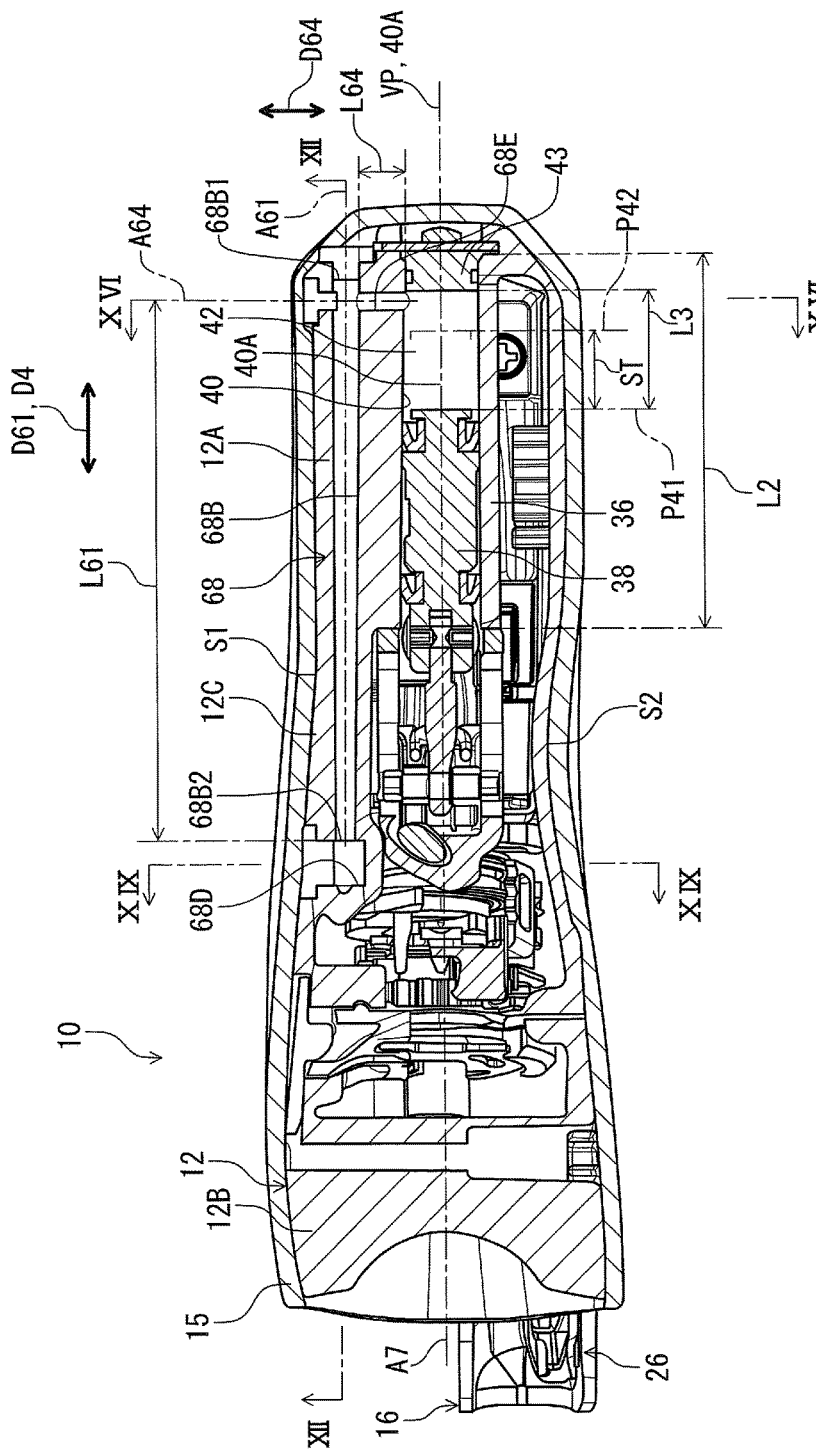
FIG. 10 is a cross-sectional view of the bicycle operating device taken along line X-X of FIG. 4.
Figure 11:
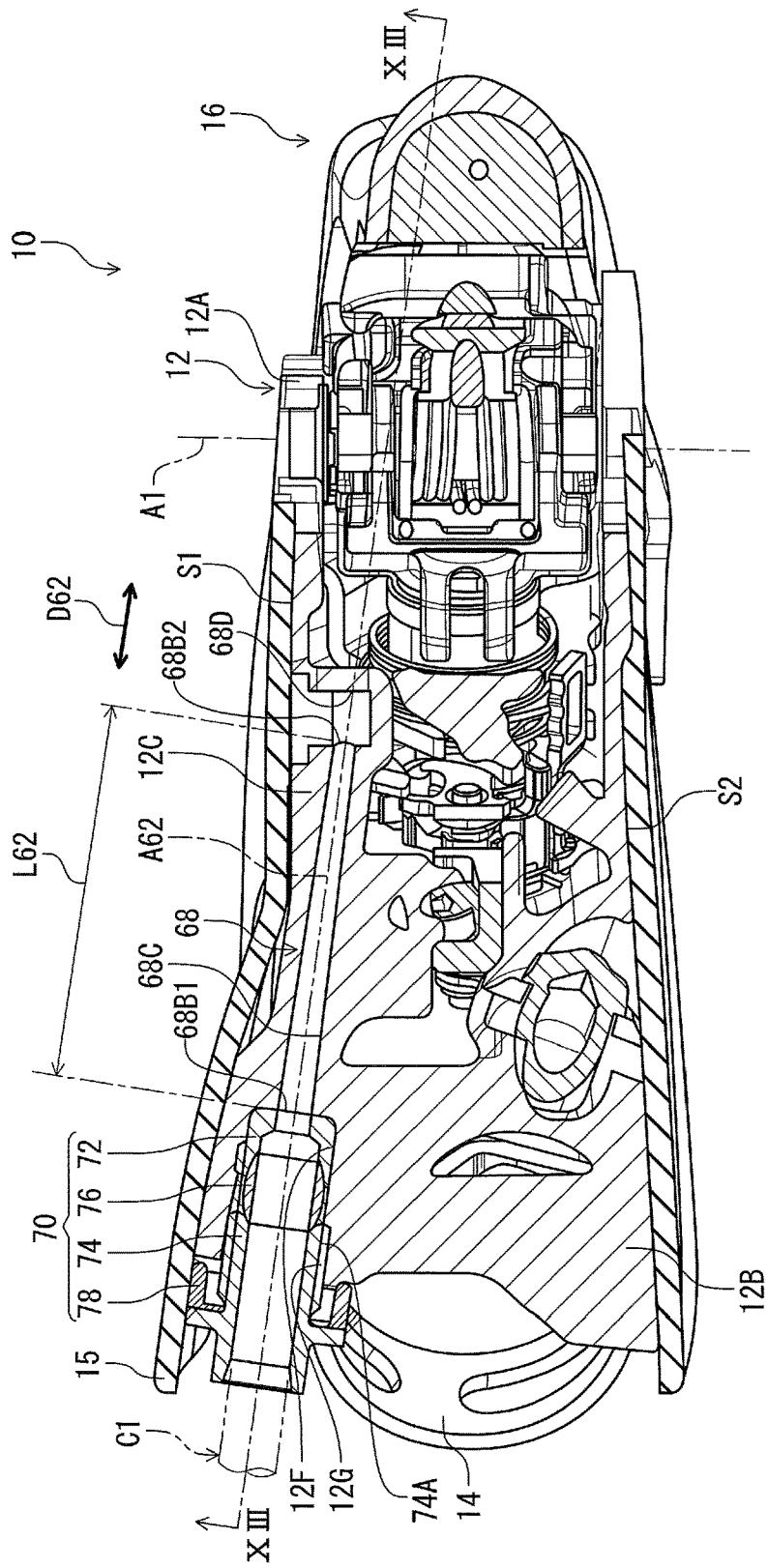
FIG. 11 is a cross-sectional view of the bicycle operating device taken along line XI-XI of FIG. 4.

As seen in FIG. 10, the base member 12 includes a fluid passageway 68. The fluid passageway 68 is connected to the hydraulic chamber 42. The fluid passageway 68 is provided inside the base member 12. As seen in FIG. 11, the base member 12 includes an outlet port 70. The outlet port 70 is connected to the fluid passageway 68 and is provided at the second end portion 12B. The fluid passageway 68 is defined from the hydraulic chamber 42 to the outlet port 70. The hydraulic hose C1 is connected to the hydraulic chamber 42 via the outlet port 70. An end of the hydraulic hose C1 is connected to the outlet port 70. As seen in FIG. 8, the base member 12 includes an inner peripheral surface 68A provided in the base member 12 and defining the fluid passageway 68.

As seen in FIG. 11, the outlet port 70 includes a receiving member 72, a connecting member 74, a first seal member 76, and a second seal member 78. The receiving member 72 and the first seal member 76 are provided in an attachment hole 12F of the base member 12. The first seal member 76 is disposed between the receiving member 72 and the connecting member 74. The second seal member 78 is disposed between the base member 12 and the connecting member 74. The connecting member 74 includes an external threaded part 74A. The attachment hole 12F includes an internal threaded part 12G threadedly engaged with the external threaded part 74A. The first and second seal members 76 and 78 are made of an elastic material such as rubber. The first seal member 76 comes into contact with an outer peripheral surface of the hydraulic hose C1 when the connecting member 74 is tightened.

As seen in FIG. 10, the fluid passageway 68 has a length longer than the stroke ST of the piston 38. The cylinder bore 40 has a cylinder axial length L2 defined in the movement direction D4. The length of the fluid passageway 68 is longer than the cylinder axial length L2. The hydraulic chamber 42 has a chamber axial length L3 defined in the movement direction D4. The length of the fluid passageway 68 is longer than the chamber axial length L3. In this embodiment, the hydraulic chamber 42 has a variable axial length in response to the movement of the piston 38 for the operation and the adjustment. The chamber axial length L3 of the hydraulic chamber 42 is defined in the rest state where the operating member 16 is at the first rest position P11 and the piston 38 is at the initial position P41 (FIG. 10). As seen in FIG. 4, the reservoir chamber 59 has a length L5 defined in the movement direction D4. The length L5 of the reservoir chamber 59 is longer than the stroke ST of the piston 38. The length of the fluid passageway 68 is longer than the length L5 of the reservoir chamber 59.

As seen in FIGS. 10 to 13, the fluid passageway 68 includes a first part 68B and a second part 68C. The second part 68C is farther from the cylinder bore 40 than the first part 68B in the fluid passageway 68. The first part 68B extends in a first direction D61. The second part 68C extends in a second direction D62 different from the first direction D61. At least one of the first part 68B and the second part 68C linearly extends. In this embodiment, each of the first part 68B and the second part 68C linearly extends. However, at least one of the first part 68B and the second part 68C can have other shapes such as a curved shape.

Figure 12:
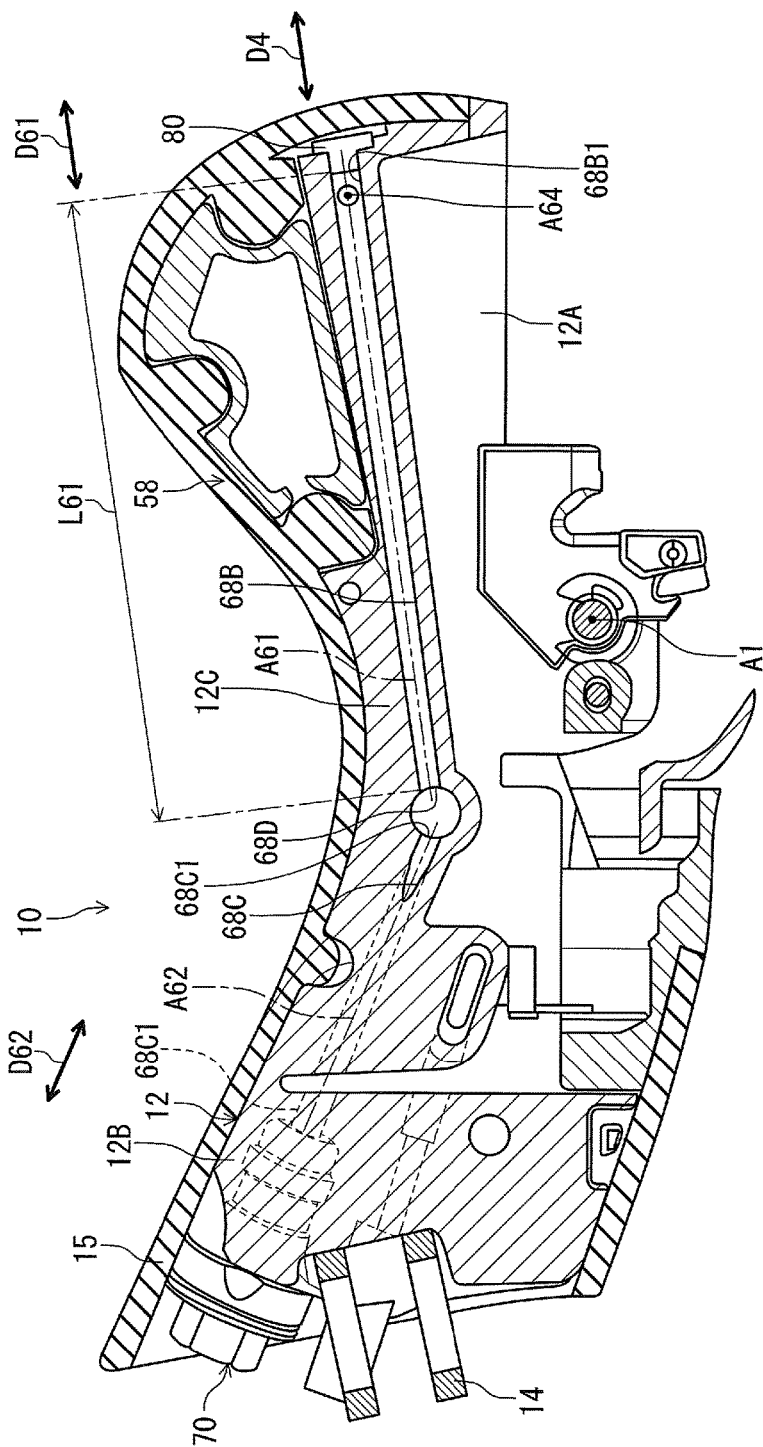
FIG. 12 is a cross-sectional view of the bicycle operating device taken along line XII-XII of FIG. 10.

As seen in FIGS. 10 and 12, the first part 68B has a first center axis A61 extending in the first direction D61. The first part 68B has a first length L61 defined along the first center axis A61. An end of the first part 68B is closed with a plug 80. The plug 80 defines the first length L61. For example, the plug 80 is made of a resin material and is non-detachably joined to the base member 12 by melting their edges and pressing them together when they are hot. Thus, the plug 80 is not detachable from the base member 12 without damage in a usage state of the bicycle operating device 10.

Figure 13:
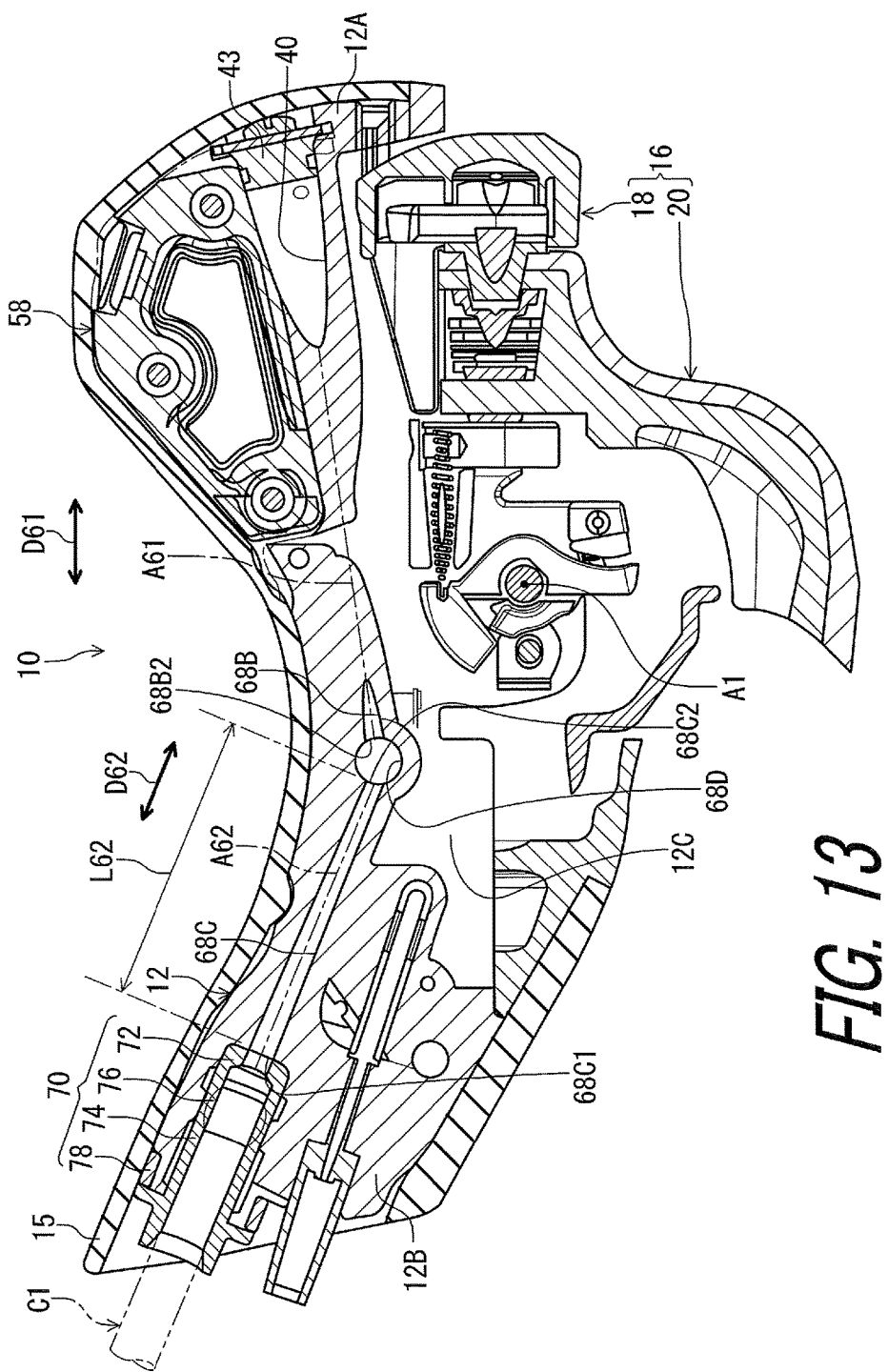
FIG. 13 is a cross-sectional view of the bicycle operating device taken along line XIII-XIII of FIG. 11.

As seen in FIGS. 11 and 13, the second part 68C has a second center axis A62 extending in the second direction D62. The second part 68C has a second length L62 defined along the second center axis A62. The second part 68C is connected to the outlet port 70.

Figure 14:
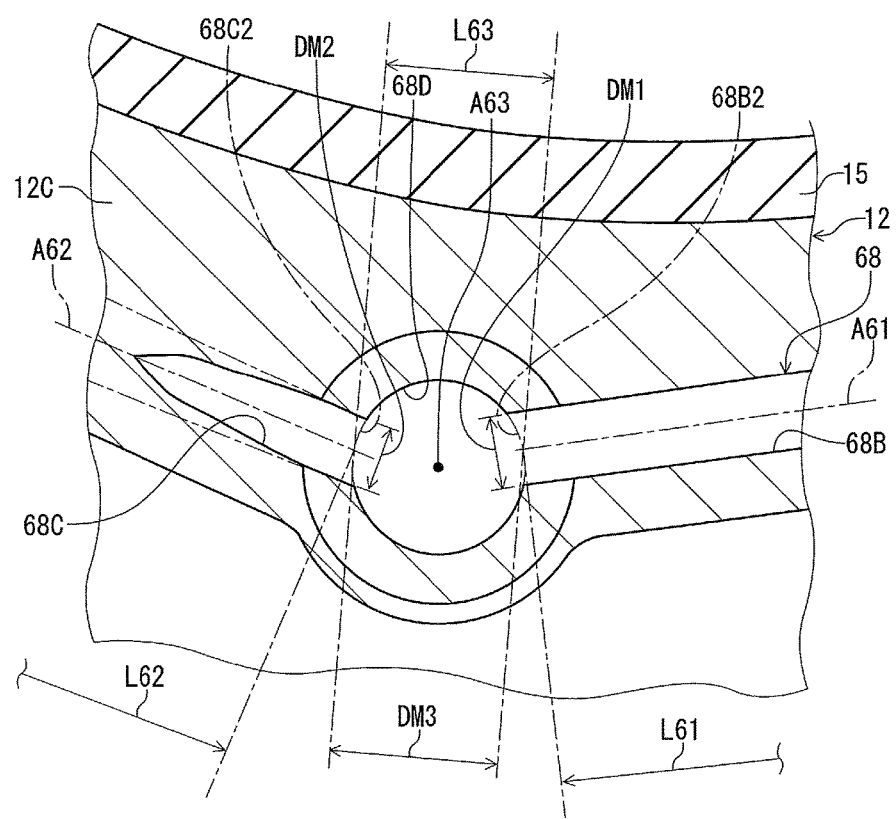
FIG. 14 is a partial enlarged cross-sectional view of the bicycle operating device illustrated in FIG. 12.
Figure 15:
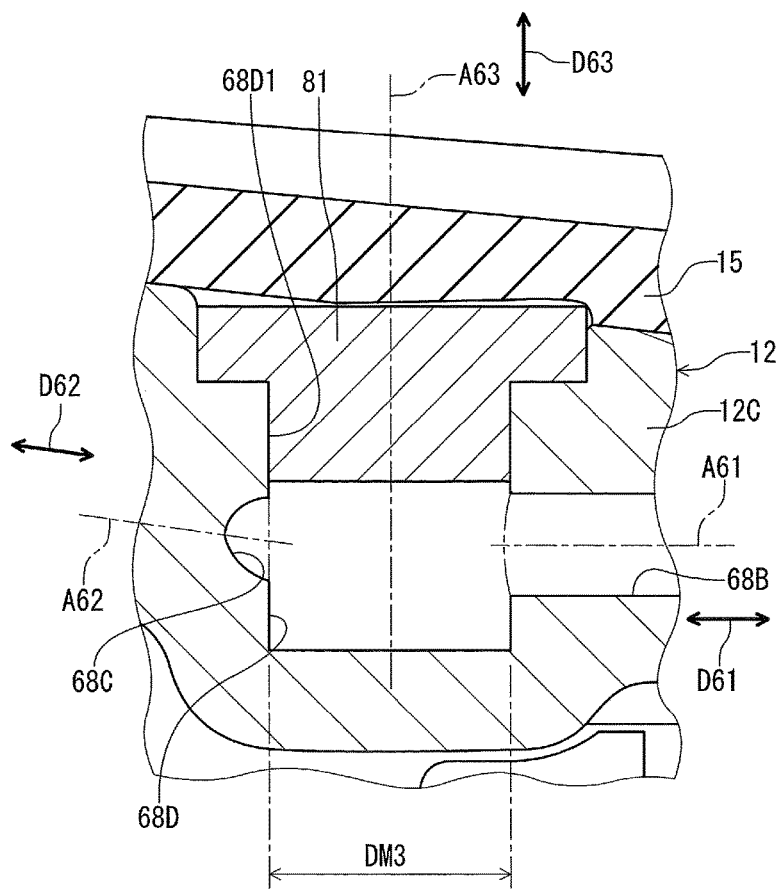
FIG. 15 is a partial enlarged cross-sectional view of the bicycle operating device illustrated in FIG. 10.

As seen in FIGS. 14 and 15, the fluid passageway 68 further includes a third part 68D connecting the first part 68B to the second part 68C. The third part 68D is provided between the first part 68B and the second part 68C. The third part 68D is provided in the grip portion 12C of the base member 12. As seen in FIG. 15, the third part 68D extends in a third direction D63 different from each of the first direction D61 and the second direction D62. The third part 68D has a third center axis A63 extending in the third direction D63. As seen in FIG. 15, an end of a hole 68D1 is closed with a plug 81. For example, the plug 81 is made of a resin material and is non-detachably joined to the base member 12 by melting their edges and pressing them together when they are hot. Thus, the plug 81 is not detachable from the base member 12 without damage in a usage state of the bicycle operating device 10.

As seen in FIG. 12, the first part 68B includes a first end 68B1 and a first additional end 68B2 opposite to the first end 68B1 along the first center axis A61. The first end 68B1 is closed with the plug 80. The first additional end 68B2 is connected to the third part 68D.

As seen in FIG. 13, the second part 68C includes a second end 68C1 and a second additional end 68C2 opposite to the second end 68C1 along the second center axis A62. The second end 68C1 is connected to the outlet port 70. The second additional end 68C2 is connected to the third part 68D. As seen in FIG. 14, the third part 68D has a third length L63 defined from the first additional end 68B2 to the second additional end 68C2.

Figure 16:
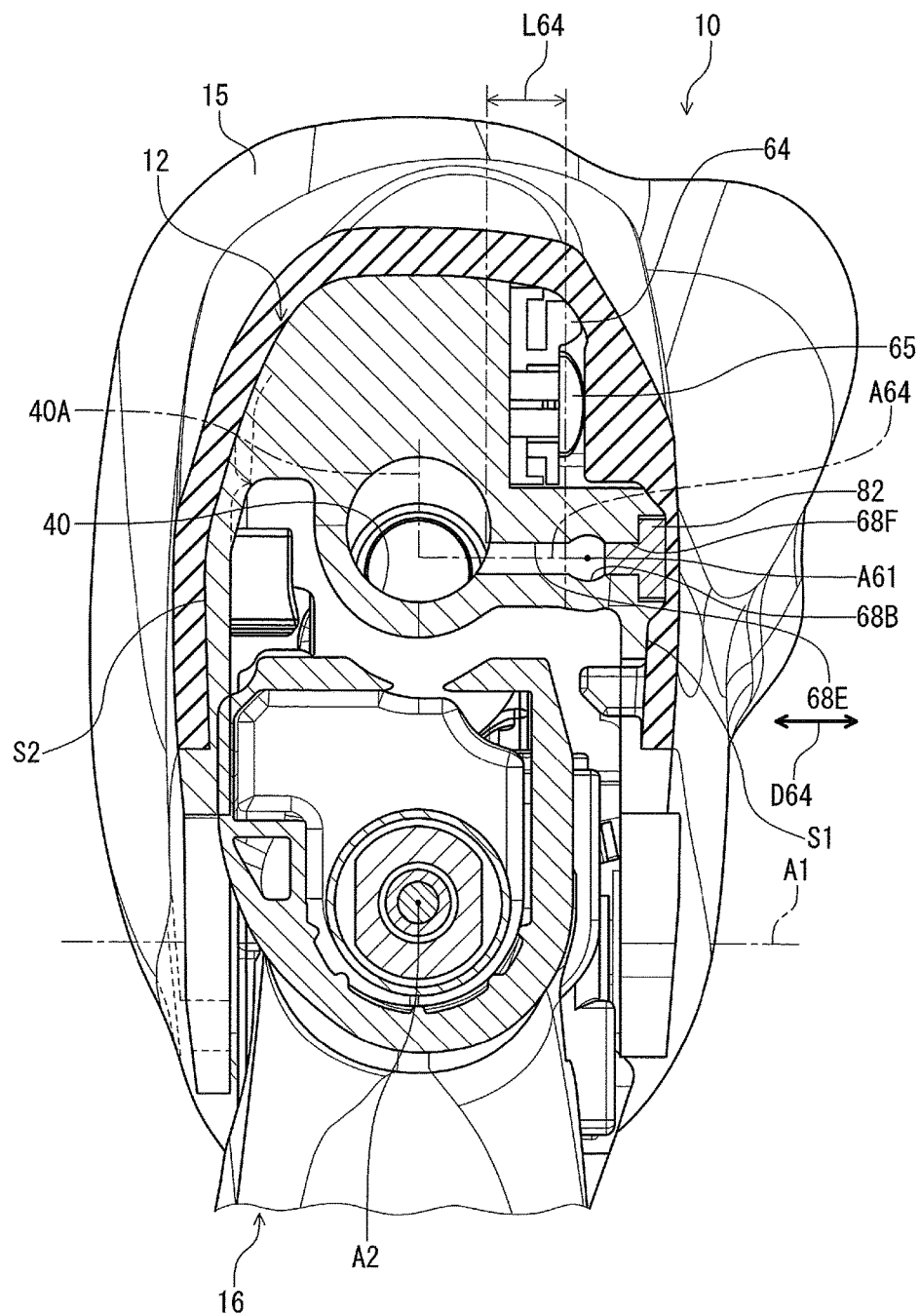
FIG. 16 is a cross-sectional view of the bicycle operating device taken along line XVI-XVI of FIG. 10.

As seen in FIGS. 10 and 16, the fluid passageway 68 further includes a fourth part 68E connecting the cylinder bore 40 to the first part 68B. The fourth part 68E perpendicularly extends from the cylinder bore 40. The first part 68B perpendicularly extends from the fourth part 68E. In this embodiment, the fourth part 68E extends in a fourth direction D64 different from each of the first direction D61, the second direction D62, and the third direction D63. The fourth part 68E has a fourth center axis A64 extending in the fourth direction D64. The cylinder bore 40 has a cylinder center axis 40A extending in the movement direction D4. The fourth part 68E extends from the cylinder bore 40 in fourth direction D64 defined perpendicularly to the cylinder center axis 40A. The fourth part 68E has a fourth length L64 defined along the fourth center axis A64. A hole 68F is provided on an opposite side of the fourth part 68E with respect to the first part 68B. The hole 68F is closed with a plug 82. For example, the plug 82 is made of a resin material and is non-detachably joined to the base member 12 by melting their edges and pressing them together when they are hot. Thus, the plug 82 is not detachable from the base member 12 without damage in a usage state of the bicycle operating device 10.

As seen in FIGS. 10 to 16, the fluid passageway 68 includes the fourth part 68E, the first part 68B, the third part 68D, and the second part 68C which are arranged from the cylinder bore 40 in this order. The length of the fluid passageway 68 is a total of the first length L61, the second length L62, the third length L63, and the fourth length L64.

As seen in FIGS. 10 and 12, the first part 68B extends so as to taper toward the second part 68C. The first part 68B has a tapered shape from the first end 68B1 to the first additional end 68B2. An inner diameter of the first part 68B gradually decreases from the first end 68B1 to the first additional end 68B2. A cross-sectional area of the first part 68B taken along the first center axis A61 gradually decreases from the first end 68B1 to the first additional end 68B2. The first part 68B has a first cross-sectional area taken along the first center axis A61.

In this embodiment, as seen in FIG. 14, the first part 68B has a first inner diameter DM1 defined at the first additional end 68B2. The first inner diameter DM1 is defined as a minimum inner diameter of the first part 68B in a case where the first part 68B has the tapered shape. The first cross-sectional area is defined as a minimum cross-sectional area of the first part 68B in a case where the first part 68B has the tapered shape.

As seen in FIGS. 11 and 13, the second part 68C extends so as to taper toward the first part 68B. The second part 68C has a tapered shape from the second end 68C1 to the second additional end 68C2. An inner diameter of the second part 68C gradually decreases from the second end 68C1 to the second additional end 68C2. A cross-sectional area of the second part 68C taken along the second center axis A62 gradually decreases from the second end 68C1 to the second additional end 68C2. The second part 68C has a second cross-sectional area taken along the second center axis A62.

In this embodiment, as seen in FIG. 14, the second part 68C has a second inner diameter DM2 defined at the second additional end 68C2. The second inner diameter DM2 is defined as a minimum inner diameter of the second part 68C in a case where the second part 68C has the tapered shape. The second cross-sectional area is defined as a minimum cross-sectional area of the second part 68C in a case where the second part 68C has the tapered shape. In this embodiment, the first inner diameter DM1 is equal to the second inner diameter DM2, and the first cross-sectional area is equal to the second cross-sectional area. However, the first inner diameter DM1 can be different from the second inner diameter DM2. The first cross-sectional area can be different from the second cross-sectional area.

As seen in FIG. 14, the third part 68D has a third inner diameter DM3 different from each of the first inner diameter DM1 and the second inner diameter DM2. The third inner diameter DM3 is larger than each of the first inner diameter DM1 and the second inner diameter DM2. The third part 68D has a third cross-sectional area taken along the third center axis A63. The third cross-sectional area is larger than each of the first cross-sectional area and the second cross-sectional area. However, the third inner diameter DM3 can be equal to or smaller than at least one of the first inner diameter DM1 and the second inner diameter DM2. The third cross-sectional area can be equal to or smaller than at least one of the first cross-sectional area and the second cross-sectional area.

Figure 17:
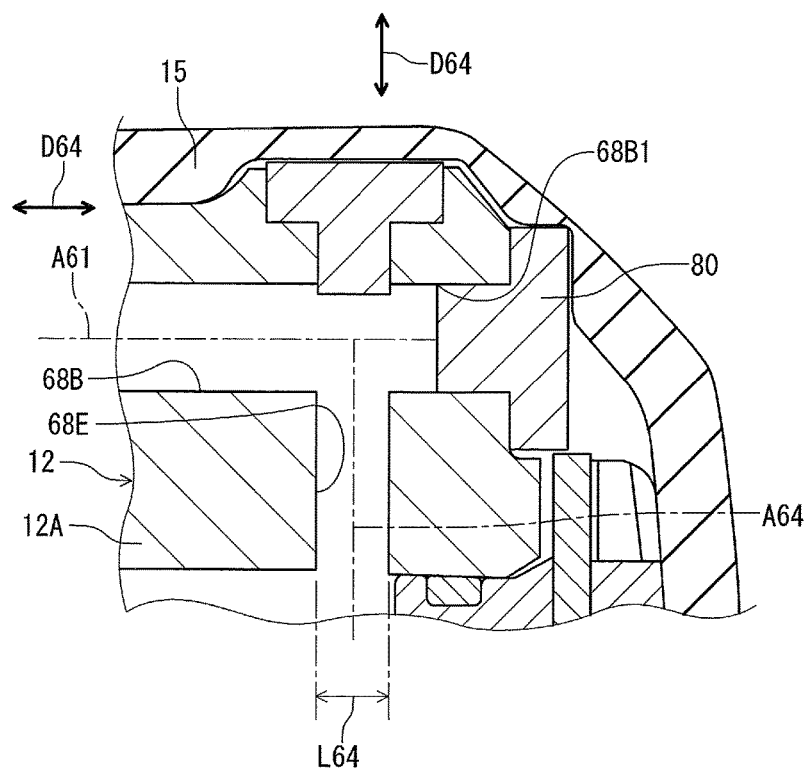
FIG. 17 is a partial enlarged cross-sectional view of the bicycle operating device illustrated in FIG. 10.

As seen in FIG. 17, the fourth part 68E has a fourth inner diameter DM4 different from each of the first inner diameter DM1 (FIG. 14), the second inner diameter DM2 (FIG. 14), and the third inner diameter DM3 (FIG. 14). The fourth inner diameter DM4 is smaller than each of the first inner diameter DM1, the second inner diameter DM2, and the third inner diameter DM3. The fourth part 68E has a fourth cross-sectional area taken along the fourth center axis A64. The fourth cross-sectional area is larger than each of the first cross-sectional area, the second cross-sectional area, and the third cross-sectional area. However, the fourth inner diameter DM4 can be equal to or smaller than at least one of the first inner diameter DM1, the second inner diameter DM2, and the third inner diameter DM3. The fourth cross-sectional area can be equal to or smaller than at least one of the first cross-sectional area, the second cross-sectional area, and the third cross-sectional area.

As seen in FIG. 8, the base member 12 includes an outer peripheral surface. The outer peripheral surface of the base member 12 includes a first side surface S1 and a second side surface S2. The second side surface S2 is laterally opposite to the first side surface S1 in the mounting state where the bicycle operating device 10 is mounted to the handlebar H. The cylinder bore 40 is provided between the first side surface S1 and the second side surface S2. The first part 68B is provided between the first side surface S1 and the cylinder bore 40.

Figure 18:
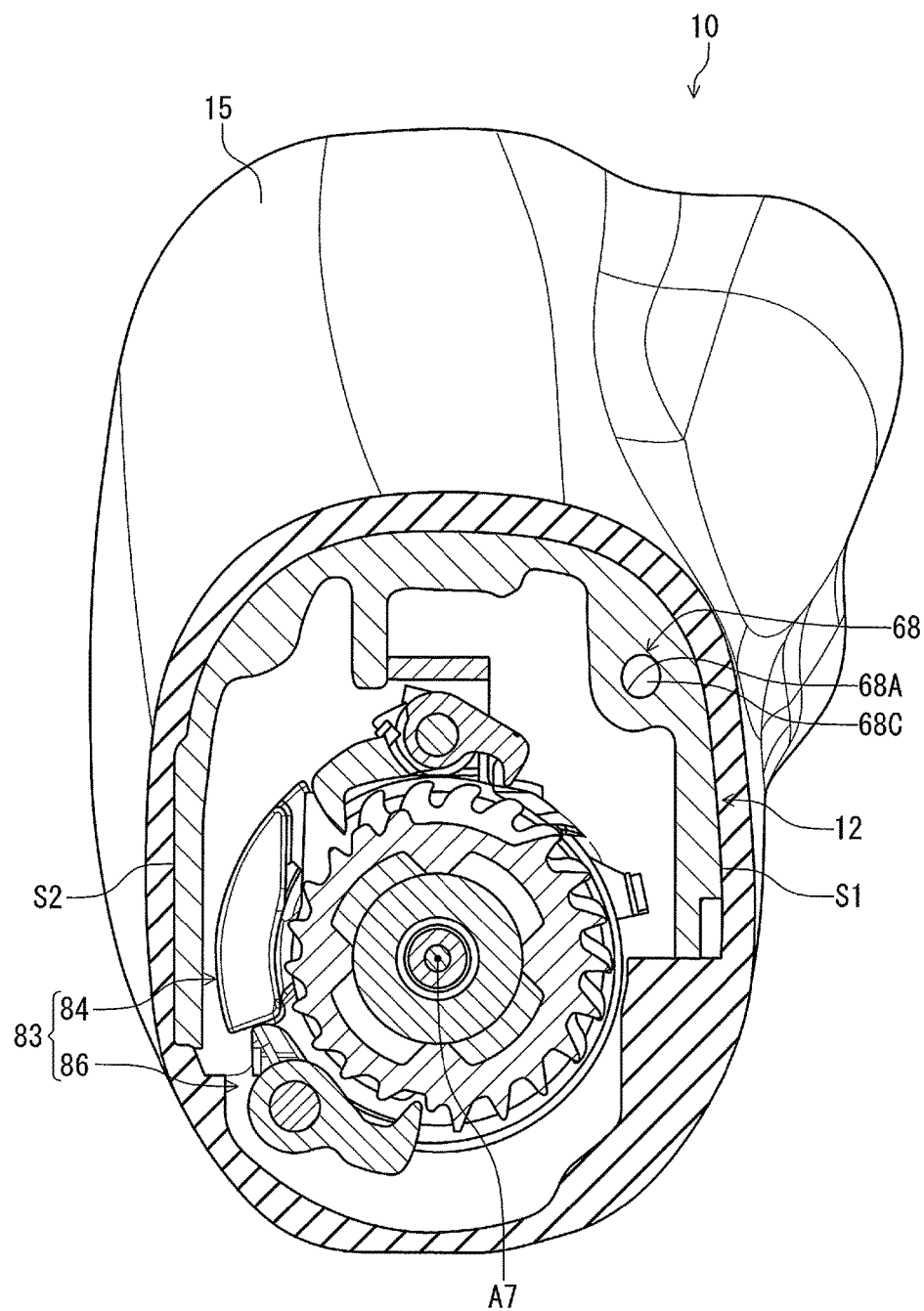
FIG. 18 is a cross-sectional view of the bicycle operating device taken along line XVIII-XVIII of FIG. 4.
Figure 19:
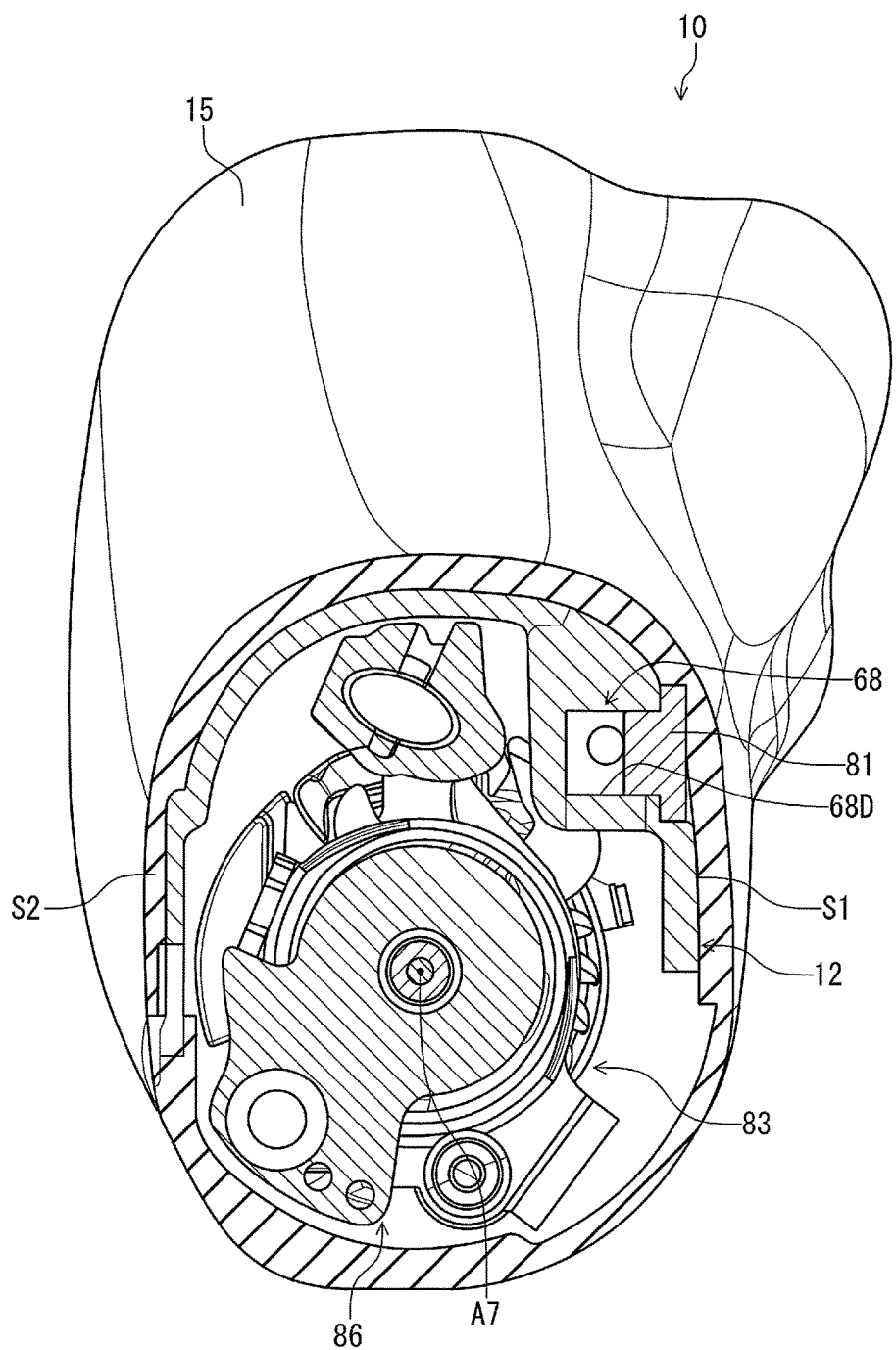
FIG. 19 is a cross-sectional view of the bicycle operating device taken along line XIX-XIX of FIG. 10.

As seen in FIGS. 10 and 16, the fluid passageway 68 is provided inside the base member 12 so as to at least partly extend between the outer peripheral surface and the cylinder bore 40. Specifically, the first part 68B extends between the first side surface S1 and the cylinder bore 40. As seen in FIG. 18, the second part 68C is provided between the first side surface S1 and the second side surface S2. As seen in FIG. 19, the third part 68D is provided between the first side surface S1 and the second side surface S2. As seen in FIGS. 18 and 19, the second part 68C and the third part 68D are closer to the first side surface S1 than the second side surface S2.

The base member 12 is made of a non-metallic material such as a resin material. In this embodiment, the base member 12 is made of a resin material. For example, the base member 12 is made of synthetic resin. The base member 12 is integrally formed by using integral molding. However, the base member 12 can be made of other materials such as a metallic material. For example, the base member 12 can be made of aluminum by using molding.

As seen in FIGS. 6 and 7, the bicycle operating device 10 further comprises a shifting unit 83 to operate a shifting device BC2. The shifting unit 83 includes a cable control member 84 pivotally provided on the base member 12 about a cable control axis A7. An inner wire of the mechanical control cable C2 is coupled to the cable control member 84. The cable control member 84 pivots relative to the base member 12 about the cable control axis A7 in response to the movement of the operating member 16 and the additional operating member 26.

The shifting unit 83 includes a cable operating structure 86 operatively coupling the operating member 16 and the additional operating member 26 to the cable control member 84. Specifically, the cable operating structure 86 pivots the cable control member 84 relative to the base member 12 in one of a pulling direction D81 and a releasing direction D82 in response to the movement of the operating member 16 (FIG. 3). Furthermore, the cable operating structure 86 pivots the cable control member 84 relative to the base member 12 in the other of the pulling direction D81 and the releasing direction D82 in response to the movement of the additional operating member 26 (FIG. 5). In this embodiment, the cable operating structure 86 pivots the cable control member 84 relative to the base member 12 in the releasing direction D82 in response to the movement of the operating member 16 (FIG. 3). Furthermore, the cable operating structure 86 pivots the cable control member 84 relative to the base member 12 in the pulling direction D81 in response to the movement of the additional operating member 26 (FIG. 5).

As seen in FIGS. 4 and 10, the cable control axis A7 and the cylinder center axis 40A are arranged to define a virtual plain together. The cable control axis A7, the cylinder center axis 40A, and the additional pivot axis A2 are arranged to define the virtual plain VP (FIG. 10) together. Structures of the shifting unit 83 have been known in the bicycle field, they will not be described in detail here for the sake of brevity. The shifting unit 83 can be omitted from the bicycle operating device 10.

The bicycle operating device 10 has the following features.

(1) The base member 12 includes the fluid passageway 68 connected to the hydraulic chamber 42. The fluid passageway 68 is provided inside the base member 12. The fluid passageway 68 has a length longer than the stroke ST of the piston 38. Accordingly, it is possible to utilize the base member 12 as an area in which the fluid passageway 68 is provided with maintaining a desired length of the fluid passageway 68. Accordingly, it is possible to make the bicycle operating device 10 compact with maintaining a desired length of the fluid passageway 68. Further, it is possible to connect a hydraulic hose C1 to the fluid passageway 68 at a preferable location of the base member 12.

(2) The base member 12 includes the inner peripheral surface 68A provided in the base member 12 and defining the fluid passageway 68. Accordingly, it is possible to effectively utilize the base member 12 as the area in which the fluid passageway 68.

(3) The fluid passageway 68 includes the first part 68B and the second part 68C farther from the cylinder bore 40 than the first part 68B in the fluid passageway 68. Accordingly, it is possible to effectively utilize a part of the base member 12 which is farther from the cylinder bore 40 as the area in which the fluid passageway 68 is provided.

(4) The first part 68B extends so as to taper toward the second part 68C. The second part 68C extends so as to taper toward the first part 68B. Accordingly, it is possible to easily remove, after forming of the base member 12, a first core and a second core which are arranged to form the first part 68B and the second part 68C during the forming of the base member 12.

(5) The first part 68B extends in the first direction D61. The second part 68C extends in the second direction D62 different from the first direction D61. Accordingly, it is possible to arrange the fluid passageway 68 along the shape of the base member 12, improving design freedom of the fluid passageway 68.

(6) At least one of the first part 68B and the second part 68C linearly extends. Accordingly, it is possible to easily form the at least one of the first part 68B and the second part 68C.

(7) The fluid passageway 68 further includes the third part 68D connecting the first part 68B to the second part 68C. Accordingly, it is possible to connect the first part 68B to the second part 68C to bring the first part 68B into communication with the second part 68C even if the first part 68B is spaced apart from the second part 68C.

(8) The first part 68B has the first inner diameter DM1. The second part 68C has the second inner diameter DM2. The third part 68D has the third inner diameter DM3 different from each of the first inner diameter DM1 and the second inner diameter DM2. Accordingly, it is possible to easily form a connecting part connecting the first part 68B to the second part 68C by using the third part 68D.

(9) The third inner diameter DM3 is larger than each of the first inner diameter DM1 and the second inner diameter DM2. Accordingly, it is possible to more easily form a connecting part connecting the first part 68B to the second part 68C by using the third part 68D.

(10) The cylinder bore 40 is provided between the first side surface S1 and the second side surface S2. The first part 68B is provided between the first side surface S1 and the cylinder bore 40. The second part 68C and the third part 68D are closer to the first side surface S1 than the second side surface S2. Accordingly, it is possible to effectively utilize the base member 12 as an area in which the first to third parts 68B to 68D are provided.

(11) Since the fluid passageway 68 further includes the fourth part 68E connecting the cylinder bore 40 to the first part 68B, it is possible to connect the cylinder bore 40 to the first part 68B via the fourth part 68E.

(12) Since the fourth part 68E perpendicularly extends from the cylinder bore 40, it is possible to effectively utilize an area which is radially outward of the cylinder bore 40 in the base member 12.

(13) Since the first part 68B perpendicularly extends from the fourth part 68E, it is possible to improve design freedom of the arrangement of the fluid passageway 68.

(14) The base member 12 includes the first end portion 12A, the second end portion 12B, the grip portion 12C, and the outlet port 70. The outlet port 70 is connected to the fluid passageway 68 and provided at the second end portion 12B. Accordingly, it is possible to introduce the hydraulic pressure to the hydraulic bicycle component BC1 via the outlet port 70 of the base member 12.

(15) Since the base member 12 is made of a resin material, it is possible to easily form the base member 12 with saving weight of the base member 12.

(16) The cover member 15 is attached to the base member 12 to at least partly cover the base member 12. The cover member 15 is at least partly made of elastic material. Accordingly, it is possible to improve comfort to operate the bicycle operating device 10 for a rider and/or to easily grip the bicycle operating device 10 for the rider.

(17) The bicycle operating device 10 further comprises the shifting unit 83 to operate the shifting device BC2. Accordingly, it is possible to operate the shifting device BC2 in addition to the hydraulic bicycle component BC1.

(18) The piston 38 is movable relative to the hydraulic cylinder 36 in the movement direction D4. The hydraulic chamber 42 has the chamber axial length L3 defined in the movement direction D4. The length of the fluid passageway 68 is longer than the chamber axial length L3. Accordingly, it is possible to effectively utilize the base member 12 as the area in which the fluid passageway 68 is provided with maintaining the desired length of the fluid passageway 68.

(19) The cylinder bore 40 has the cylinder axial length L2 defined in the movement direction D4. The length of the fluid passageway 68 is longer than the cylinder axial length L2. Accordingly, it is possible to more effectively utilize the base member 12 as the area in which the fluid passageway 68 is provided with maintaining the desired length of the fluid passageway 68.

(20) The bicycle operating device 10 further comprises the operating member 16 configured to be pivotable relative to the base member 12 about the pivot axis A1 between the rest position P11 and the operated position P12. The piston 38 is configured to be pushed from the initial position P41 to the actuated position P42 in response to the movement of the operating member 16 from the rest position P11 toward the operated position P12 to supply the hydraulic pressure toward at least one bicycle component BC1. Accordingly, it is possible to operate the at least one bicycle component BC1 by using the operating member 16 and the hydraulic pressure.

Second Embodiment

A bicycle operating device 210 in accordance with a second embodiment will be described below referring to FIG. 20. The bicycle operating device 210 has the same structure and/or configuration as those of the bicycle operating device 10 except for the base member 12. Thus, elements having substantially the same function as those in the first embodiment will be numbered the same here, and will not be described and/or illustrated again in detail here for the sake of brevity.

Figure 20:
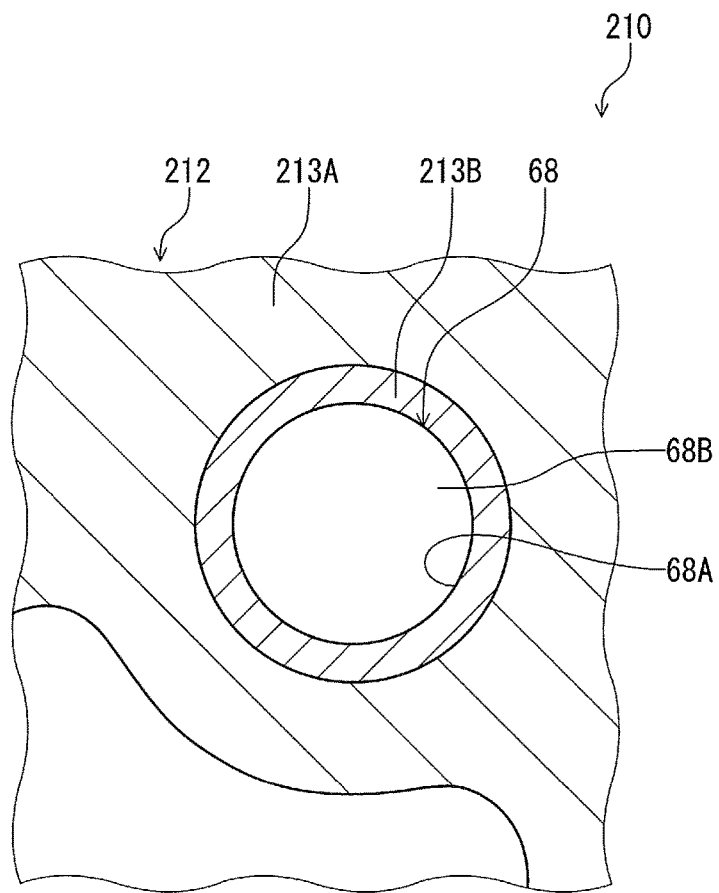
FIG. 20 is a partial enlarged cross-sectional view of a bicycle operating device in accordance with a second embodiment.

As seen in FIG. 20, the bicycle operating device 10 comprises a base member 212. The base member 212 has substantially the same structure as that of the base member 12 of the first embodiment. Unlike the base member 12 of the first embodiment, the base member 212 includes a base body 213A and a pipe part 213B. The pipe part 213B is at least partly disposed in the base body 213A and is integrally provided with the base body 213A. The pipe part 213B includes the inner peripheral surface 68A. The pipe part 213B at least partly defines the fluid passageway 68.

The base body 213A is made of a material such as a resin material. The pipe part 213B is a separate member from the base body 213A. The pipe part 213B is made of a material different from the material of the base body 213A. The pipe part 213B is made of a metallic material such as aluminum. The pipe part 213B is provided in the base body 213A by using integral molding such as insert molding.

With the bicycle operating device 210, it is possible to obtain substantially the same effects as those of the bicycle operating device 10 of the first embodiment.

Furthermore, the base member 212 includes the base body 213A and the pipe part 213B at least partly disposed in the base body 213A and integrally provided with the base body 213A. The pipe part 213B includes the inner peripheral surface 68A. Accordingly, it is possible to easily form the fluid passageway 68.

Third Embodiment

A bicycle operating device 310 in accordance with a third embodiment will be described below referring to FIG. 21. The bicycle operating device 310 has the same structure and/or configuration as those of the bicycle operating device 10 except for the base member 12. Thus, elements having substantially the same function as those in the first embodiment will be numbered the same here, and will not be described and/or illustrated again in detail here for the sake of brevity.

Figure 21:
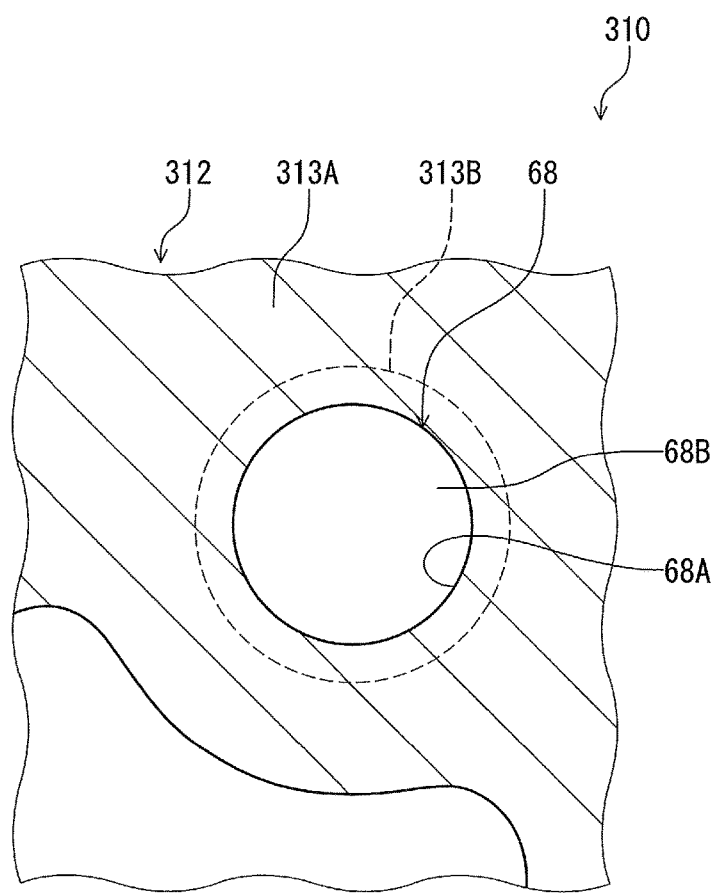
FIG. 21 is a partial enlarged cross-sectional view of a bicycle operating device in accordance with a third embodiment.

As seen in FIG. 21, the bicycle operating device 10 comprises a base member 312. The base member 312 has substantially the same structure as that of the base member 12 of the first embodiment. Unlike the base member 12 of the first embodiment, the base member 312 includes a base body 313A and a pipe part 313B. The pipe part 313B is at least partly disposed in the base body 313A and is integrally provided with the base body 313A. The pipe part 313B includes the inner peripheral surface 68A. The pipe part 313B at least partly defines the fluid passageway 68.

The base body 313A is made of a material such as a resin material. The pipe part 313B is integrally provided with the base body 313A as a one-piece unitary member. The pipe part 313B is made of the same material as the material of the base body 313A. The pipe part 313B is made of a non-metallic material such as a resin material.

The pipe part 313B is provided in the base body 313A by using integral molding such as insert molding. In a case where the pipe part 313B and the base body 313A are made of the resin material, the pipe part 313B is substantially integrally provided with a one-piece unitary member since the pipe part 313B is at least partly joined together with the base body 313A. However, the pip part 313B can be made of a resin material different from the resin material of the base body 313A.

With the bicycle operating device 310, it is possible to obtain substantially the same effects as those of the bicycle operating device 10 of the first embodiment.

Furthermore, the base member 312 includes the base body 313A and the pipe part 313B at least partly disposed in the base body 313A and integrally provided with the base body 313A. The pipe part 313B includes the inner peripheral surface 68A. Accordingly, it is possible to easily form the fluid passageway 68.

Fourth Embodiment

A bicycle operating device 410 in accordance with a fourth embodiment will be described below referring to FIG. 22. The bicycle operating device 410 has the same structure and/or configuration as those of the bicycle operating device 10 except for the arrangement of some elements. Thus, elements having substantially the same function as those in the above embodiments will be numbered the same here, and will not be described and/or illustrated again in detail here for the sake of brevity.

Figure 22:
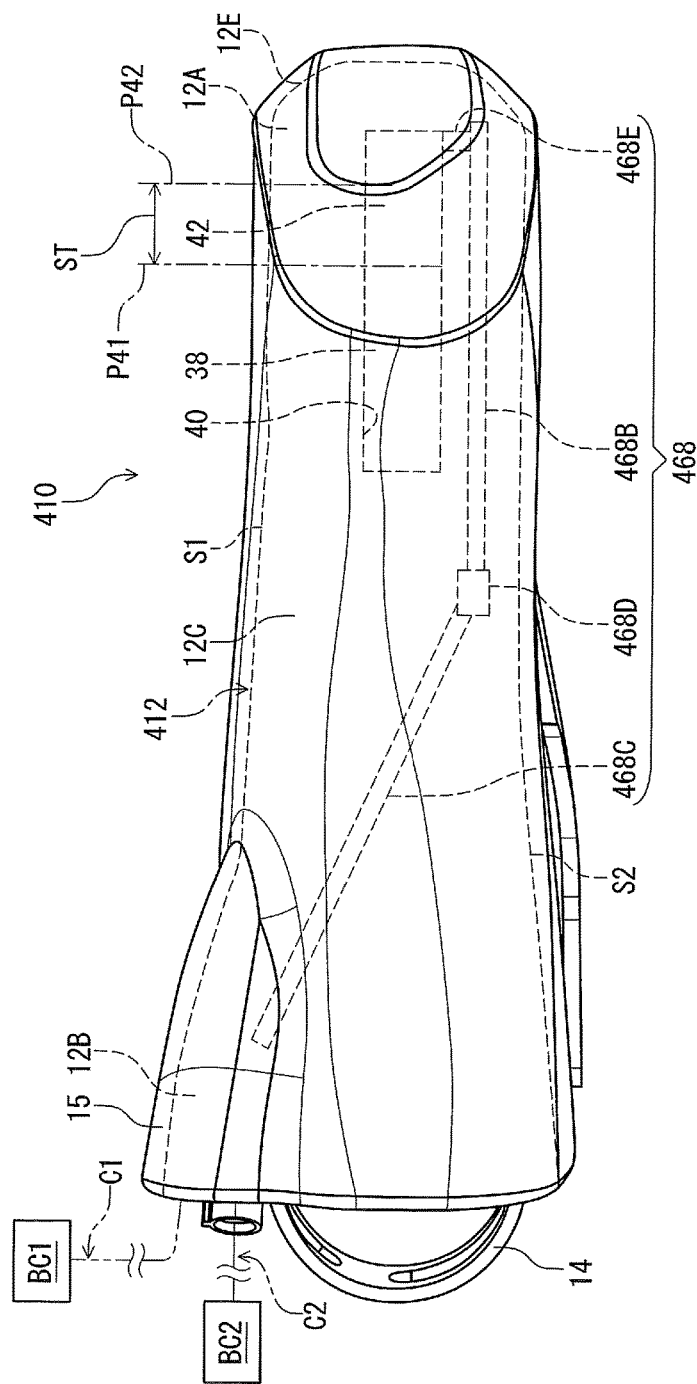
FIG. 22 is a top view a bicycle operating device in accordance with a fourth embodiment.

As seen in FIG. 22, the bicycle operating device 410 comprises a base member 412. The base member 412 has substantially the same structure as that of the base member 12 of the first embodiment. Unlike the base member 12 of the first embodiment, the base member 412 includes a fluid passageway 468 connected to the hydraulic chamber 42. The fluid passageway 468 is provided inside the base member 412. The fluid passageway 468 has a length longer than the stroke ST of the piston 38.

The fluid passageway 468 includes a first part 468B, a second part 468C, a third part 468D, and a fourth part 468E. The first to fourth parts 468B to 468E have substantially the same structures as those of the first to fourth parts 68B to 68E.

The base member 412 includes the first side surface S1 and the second side surface S2. The first part 468B is provided between the second side surface S2 and the cylinder bore 40. The third part 468D is closer to the second side surface S2 than the first side surface S1. The second part 468C extends from the third part 468D toward the first side surface S1.

With the bicycle operating device 410, it is possible to obtain substantially the same effects as those of the bicycle operating device 10 of the first embodiment.

Furthermore, the first part 468B is provided between the second side surface S2 and the cylinder bore 40. The third part 468D is closer to the second side surface S2 than the first side surface S1. The second part 468C extends from the third part 468D toward the first side surface S1. Accordingly, it is possible to effectively utilize the base member 412 as an area in which the first to third parts 468B to 468D are provided.

It will be apparent to those skilled in the bicycle field from the present disclosure that the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
    a base member configured to be mounted to a bicycle and having a first end portion and a second end portion opposite to the first end portion, the second end portion being mounted to a handlebar of the bicycle in a mounting state where the bicycle operating device is mounted to the bicycle;
    a hydraulic cylinder provided on the base member and including a cylinder bore;
    a piston movably provided in the cylinder bore, the cylinder bore and the piston defining a hydraulic chamber; and
    a fluid passageway connected to the hydraulic chamber, the fluid passageway being provided inside the base member, a first part of the fluid passageway extending outside of the handlebar in the mounting state having a length longer than a stroke of the piston, the first part of the fluid passageway extending toward the second end portion, the first part tapering by becoming gradually narrower as the first part extends in a direction toward the second end portion.

2. The bicycle operating device according to claim 1, wherein
    the base member includes an inner peripheral surface provided in the base member and defining the fluid passageway.

3. The bicycle operating device according to claim 2, wherein
    the base member includes
        a base body, and
        a pipe part at least partly disposed in the base body and integrally provided with the base body, and
    the pipe part includes the inner peripheral surface.

4. The bicycle operating device according to claim 1, wherein
    the fluid passageway includes
        a second part farther from the cylinder bore than the first part in the fluid passageway.

5. The bicycle operating device according to claim 4, wherein
    the first part extends so as to taper by becoming gradually narrower toward the second part, and
    the second part extends so as to taper by becoming gradually narrower toward the first part.

6. The bicycle operating device according to claim 4, wherein
    the first part extends in a first direction, and
    the second part extends in a second direction different from the first direction, and
    the fluid passageway includes a third part extending from the first part and extending from the second part.

7. The bicycle operating device according to claim 4, wherein
    at least one of the first part and the second part linearly extends.

8. The bicycle operating device according to claim 4, wherein
    the fluid passageway further includes a third part connecting the first part to the second part.

9. The bicycle operating device according to claim 8, wherein
    the first part has a first inner diameter,
    the second part has a second inner diameter, and the third part has a third inner diameter different from each of the first inner diameter and the second inner diameter.

10. The bicycle operating device according to claim 9, wherein
the third inner diameter is larger than each of the first inner diameter and the second inner diameter.

11. The bicycle operating device according to claim 8, wherein
the base member includes a first side surface and a second side surface laterally opposite to the first side surface in the mounting state,
the cylinder bore is provided between the first side surface and the second side surface,
the first part is provided between the first side surface and the cylinder bore, and
the second part and the third part are closer to the first side surface than the second side surface.

12. The bicycle operating device according to claim 8, wherein
the base member includes a first side surface and a second side surface laterally opposite to the first side surface in the mounting state,
the cylinder bore is provided between the first side surface and the second side surface,
the first part is provided between the second side surface and the cylinder bore,
the third part is closer to the second side surface than the first side surface, and
the second part extends from the third part toward the first side surface.

13. The bicycle operating device according to claim 8, wherein
the fluid passageway further includes a fourth part connecting the cylinder bore to the first part.

14. The bicycle operating device according to claim 13, wherein
the fourth part perpendicularly extends from the cylinder bore.

15. The bicycle operating device according to claim 14, wherein
the first part perpendicularly extends from the fourth part.

16. The bicycle operating device according to claim 1, wherein
the base member includes
a grip portion provided between the first end portion and the second end portion, and
an outlet port connected to the fluid passageway and provided at the second end portion.

17. The bicycle operating device according to claim 1, wherein
the base member is made of a resin material.

18. The bicycle operating device according to claim 1, further comprising:
a cover member attached to the base member to at least partly cover the base member, the cover member being at least partly made of elastic material.

19. The bicycle operating device according to claim 1, further comprising:
a shifting unit to operate a shifting device.

20. The bicycle operating device according to claim 1, wherein
the piston is movable relative to the hydraulic cylinder in a movement direction,
the hydraulic chamber has a chamber axial length defined in the movement direction, and
the length of the fluid passageway is longer than the chamber axial length.

21. The bicycle operating device according to claim 20, wherein
the cylinder bore has a cylinder axial length defined in the movement direction, and
the length of the fluid passageway is longer than the cylinder axial length.

22. The bicycle operating device according to claim 1, further comprising:
an operating member configured to be pivotable relative to the base member about a pivot axis between a rest position and an operated position, wherein
the piston is configured to be pushed from an initial position to an actuated position in response to a movement of the operating member from the rest position toward the operated position to supply a hydraulic pressure toward at least one bicycle component.

23. A bicycle operating device comprising:
a base member configured to be mounted to a bicycle;
a hydraulic cylinder provided on the base member and including a cylinder bore;
a piston movably provided in the cylinder bore, the cylinder bore and the piston defining a hydraulic chamber; and
a fluid passageway connected to the hydraulic chamber, the fluid passageway being provided inside the base member, the fluid passageway including a first part and a second part farther from the cylinder bore than the first part in the fluid passageway, the first part extending so as to taper by becoming gradually narrower toward the second part, the second part extending so as to taper by becoming gradually narrower toward the first part.

24. A bicycle operating device comprising:
a base member configured to be mounted to a bicycle, the base member including an outer peripheral surface and having a first end portion and a second end portion opposite to the first end portion, the second end portion being mounted to a handlebar of the bicycle;
a hydraulic cylinder provided on the base member and including a cylinder bore having a cylinder center axis;
a piston movably provided in the cylinder bore, the cylinder bore and the piston defining a hydraulic chamber;
a fluid passageway connected to the hydraulic chamber, the fluid passageway having a first part with a passageway center axis and being provided inside the base member so as to at least partly extend through an area between the outer peripheral surface and the cylinder bore when viewed in a direction orthogonal to the cylinder center axis and that crosses the passageway center axis, the first part of the fluid passageway and the passageway center axis extending toward the second end portion, and
an operating member configured to be pivotable relative to the base member about a pivot axis to move the piston, wherein
the fluid passageway has another part in fluid connection with the first part, the another part having another passageway center axis and being provided inside the base member, the another passageway center axis of the another part extending in a direction parallel to the pivot axis.

25. A bicycle operating device comprising:
a base member configured to be mounted to a bicycle and having a first end portion and a second end portion opposite to the first end portion, the second end portion being mounted to a handlebar of the bicycle in a mounting state where the bicycle operating device is mounted to the bicycle;
a hydraulic cylinder provided on the base member and including a cylinder bore;
a piston movably provided in the cylinder bore, the cylinder bore and the piston defining a hydraulic chamber;
a fluid passageway connected to the hydraulic chamber, the fluid passageway being provided inside the base member, a first part of the fluid passageway extending outside of the handlebar in the mounting state having a length longer than a stroke of the piston, the first part of the fluid passageway extending toward the second end portion; and
an operating member configured to be pivotable relative to the base member about a pivot axis to move the piston, wherein
the fluid passageway has another part in fluid connection with the first part, the another part having a passageway center axis and being provided inside the base member, the passageway center axis of the another part extending in a direction parallel to the pivot axis.

* * * * *